US009258264B1

(12) United States Patent
Shoham et al.

(10) Patent No.: US 9,258,264 B1
(45) Date of Patent: Feb. 9, 2016

(54) PROCESSING SOCIALLY NETWORKED ENTITIES

(75) Inventors: Yoav Shoham, Los Altos Hills, CA (US); Michael Mills, Palo Alto, CA (US)

(73) Assignee: Google Inc., Mountain View, CA (US)

(*) Notice: Subject to any disclaimer, the term of this patent is extended or adjusted under 35 U.S.C. 154(b) by 616 days.

(21) Appl. No.: 13/436,649

(22) Filed: Mar. 30, 2012

Related U.S. Application Data

(60) Provisional application No. 61/469,266, filed on Mar. 30, 2011.

(51) Int. Cl.
*G06F 15/16* (2006.01)
*H04L 12/58* (2006.01)
*H04L 29/08* (2006.01)

(52) U.S. Cl.
CPC ............. *H04L 51/32* (2013.01); *H04L 12/588* (2013.01); *H04L 67/14* (2013.01); *H04L 67/306* (2013.01)

(58) Field of Classification Search
CPC ...... H04L 12/588; H04L 67/16; H04L 67/306
USPC .................................. 709/204–206; 715/734
See application file for complete search history.

(56) References Cited

U.S. PATENT DOCUMENTS

| 7,844,671 | B1 * | 11/2010 | Lawler et al. | 709/206 |
| 7,853,881 | B1 * | 12/2010 | Aly Assal et al. | 715/734 |
| 2004/0002995 | A1 * | 1/2004 | Martino et al. | 707/104.1 |
| 2009/0082038 | A1 * | 3/2009 | McKiou et al. | 455/456.6 |
| 2010/0164863 | A1 * | 7/2010 | Tunick et al. | 345/156 |

OTHER PUBLICATIONS

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.
Nathan Eagle et al., "Social Serendipity: Proximity Sensing and Cueing," MIT Media Laboratory Technical Note 580, May 2004, 18 pages.
Ronald van Eijk et al., "We-centric, context-aware, adaptive mobile service bundles," Telematica Instituut, Freeband Frux D1.1, Nov. 30, 2004, 48 pages.

(Continued)

*Primary Examiner* — Vivek Srivastava
*Assistant Examiner* — Karina J Garcia-Ching
(74) *Attorney, Agent, or Firm* — Fish & Richardson P.C.

(57) ABSTRACT

Implementations are directed to accessing social network data of a user, including relationship data representative of relationships between the user and a plurality of entities associated with the user by at least one social network service, the social network data including profile data descriptive of the plurality of entities, the profile data including a profile for each of the plurality of entities and one or more attributes within each profile, the profile data including a plurality of values for the attribute, wherein the one or more attributes represent at least one of an intensity of interaction with the user, the plurality of values representing intensities of interaction with the user, and a social distance from the user, the plurality of values further representing social distances from the user, determining a subset of the plurality of entities, and determining being based on at least one of the one or more attributes.

20 Claims, 27 Drawing Sheets

(56) References Cited

OTHER PUBLICATIONS

Marc Steen et al., "Development of we-centric, context-aware, adaptive mobile services requires empathy and dialogue," Freeband Frux, 2005, 4 pages.

Alice Emily Marwick, "Selling Your Self: Online Identity in the Age of a Commodified Internet," Thesis for degree of Master of Arts, University of Washington, 2005, 192 pages.

* cited by examiner

FIG. 24

PROCESSING SOCIALLY NETWORKED ENTITIES

CROSS-REFERENCE TO RELATED APPLICATIONS

This application claims the benefit of U.S. Prov. App. No. 61/469,266, filed Mar. 30, 2011, the disclosures of which is expressly incorporated herein by reference in the entirety.

BACKGROUND

The subject matter disclosed herein generally relates to the processing of data. Specifically, the present disclosure addresses systems and methods of processing socially networked entities.

A social network may represent social relationships between a user of a social network service and one or more entities, some or all of which may also be users of the social network service. A user or an entity may be a person (e.g., a human), a group of people (e.g., a family organization), a persona (e.g., a celebrity or fictitious character), a business (e.g., a corporation), or any suitable combination thereof. Within the social network, entities may be associated with a user by relationship data maintained by one or more server machines that facilitate provision of the social network service. The server machines may maintain information that describes an entity as profile data (e.g., a profile) of the entity.

Multiple social network services may be implemented by different server machines or different groups of server machines. The social network of a user may be represented, in whole or in part, by one or more social network services contemporaneously (e.g., simultaneously). Accordingly, a user may use (e.g., subscribe to) different social network services at the same time. A social network service provider may provide one or more social network services to a user.

SUMMARY

Innovative aspects of the subject matter described in this disclosure may be embodied in methods that include the actions of accessing social network data of a user, the social network data including relationship data representative of social relationships between the user and a plurality of entities associated with the user by at least one social network service, the social network data including profile data descriptive of the plurality of entities, the profile data including a profile for each of the plurality of entities and one or more attributes within each profile, the profile data including a plurality of values for the attribute, wherein the one or more attributes represent at least one of an intensity of interaction with the user, the plurality of values representing intensities of interaction with the user, and a social distance from the user, the plurality of values further representing social distances from the user, determining a subset of the plurality of entities, the determining being performed by a processor of a machine and based on at least one of the one or more attributes, and storing a representation of the subset of the plurality of entities. Other implementations of this aspect include corresponding systems, apparatus, and computer programs, configured to perform the actions of the methods, encoded on computer storage devices.

These and other implementations may each optionally include one or more of the following features. For instance, actions further include determining a value of the plurality of values representing intensities of interactions, the value being determined based on at least one of a frequency of contact with the user, a length of a particular interaction with the user, and content of a particular interaction with the user; actions further include presenting the representation of the subset of the plurality of entities as corresponding to one of at least one of the intensities of interactions with the user and at least one of the social distances from the user; actions further include determining at least one of the values for the social distance based on the profile data, the social distance indicating at least one of: a degree of closeness of the entity to the user, an extent of trust between the entity and the user, and a level of respect for the entity by the user; actions further include: determining at least one of the values for the social distance based on the profile data, the social distance indicating at least one of: a number of entities designated as contacts shared in common by the user and by the entity, and a personal interest designated as shared in common by the user by the entity; actions further include: retrieving the social network data from a plurality of server machines based on the user being associated with the plurality of entities by multiple social network services, retrieving the social network data including: retrieving the relationship data from at least some of the plurality of server machines, and retrieving the profile data from at least some of the plurality of server machines; retrieving the social network data from the plurality of server machines is based on the user being associated with the plurality of entities by multiple social network services including at least two of a contact management service, a micro-blogging service and a messaging service; the social network data of the user is retrieved from a plurality of server machines that provide multiple social network services to the user, and the multiple social network services each associating a different subset of the plurality of entities with the user; the multiple social network services include at least two of a contact management service, a micro-blogging service and a messaging service; the at least one social network service provides a messaging service to the user, the messaging service using a contact database that stores information usable to address a interaction to a potential recipient among a plurality of potential recipients; the potential recipient is one of the plurality of entities and is at least one of: a sender of a message previously communicated to the user, a receiver of another message previously communicated from the user, a sender of a further message that mentions the user, and a receiver of the further message that mentions the user; determining the subset of the plurality of entities is based on a particular value of an attribute of the one or more attributes being included in each profile of one or more example entities selected by the user from the plurality of entities; actions further include presenting the user with a recommendation that a message be communicated to each entity in the subset of the plurality of entities; actions further include determining that a search of at least some of the plurality of entities by the user is requested, wherein determining the subset is in response to the search; actions further include presenting a visual representation of activities to the user, the activities being performed with respect to the at least one social network service by at least one of the user or an entity in the subset of the plurality of entities, the visual representation indicating at least one of: popularity, frequency of submissions, amount of time spent in interacting with the at least one social network service, precision in interactions sent, and responsiveness to interactions received; actions further include: accessing an advertisement associated with an entity in the subset of the plurality of entities, and presenting the advertisement to the user; actions further include: determining that a live interaction between the user and an entity in the subset of the plurality of entities is occurring, the profile of the entity including a status update for the entity published by the at least one social network service, and presenting the status update for the entity to the user in response to the live interaction.

Innovative aspects of the subject matter described in this disclosure may be embodied in methods that include the actions of accessing social network data of a user, the social network data including relationship data representative of social relationships between the user and a first plurality of entities associated with the user by at least one social network service, accessing data regarding at least one of interactions between the user and a second plurality of entities on a first interaction service separate from the social network service, and social distances between the user and the second plurality of entities, and modifying the relationship data associated with the user, modifying being performed by a processor of a machine and based on the data regarding at least one of the interactions between the user and a second plurality of entities on the first interaction service, and the social distances between the user and the second plurality of entities. Other implementations of this aspect include corresponding systems, apparatus, and computer programs, configured to perform the actions of the methods, encoded on computer storage devices.

These and other implementations may each optionally include one or more of the following features. For instance, actions further include accessing data regarding interactions between the user and a third plurality of entities on a second interaction service separate from the social network service, wherein modifying the relationship data associated with the user is based on the data regarding the interactions between the user and the third plurality of entities on the second interaction service separate from the social network service; the first interaction service is one of a messaging service, a text messaging service, a telephony service, and a microblogging service; modifying includes determining a subset of the first plurality of entities; modifying includes: determining a subset of the second plurality of entities that are not included in the first plurality of entities, and adding data representative of the subset of the second plurality of entities to the relationship data associated with the user; accessing the social network data of the user includes: obtaining a user identifier and password from the user for the at least one social network service, and using the user identifier and password to access the social network data from the at least one social network service; actions further include determining an intensity of interaction between the user and each of the entities in the second plurality of entities; at least some of the second plurality of entities are common entities that are also included in the first plurality of entities, and modifying includes determining a subset of the first plurality of entities based on the intensity of interaction between the user and each of the entities in the second plurality of entities; modifying includes changing an attribute that defines a relationship between the user and a subset of the first plurality of entities based on the intensity of interaction; modifying includes defining, being based on the intensity of interaction, a recipient list for a interaction; the social network data includes data representative of social distances between the user and the first plurality of entities associated with the user by the first social network service, and modifying the relationship data is based on the social distances between the user and the first plurality of entities; the social distances indicate at least one of degrees of closeness between the user and the first plurality of entities, degrees of trust between the user and the first plurality of entities, levels of respect between the user and the first plurality of entities, numbers of entities designated as contacts shared in common between the user and the first plurality of entities, and personal interests designated as shared in common between the user and the first plurality of entities.

Innovative aspects of the subject matter described in this disclosure may be embodied in methods that include the actions of accessing a user profile that describes a user, the user profile being included in profile data descriptive of a plurality of entities associated with the user by at least one social network service, the user profile including an attribute able to have one or more of a plurality of values for the attribute, a value among the plurality of values for the attribute being absent from the user profile while being descriptive of the user, determining that the value descriptive of the user is absent from the user profile of the user, determining being performed by a processor of a machine, and storing the value that is descriptive of the user in the user profile of the user, the storing of the value being based on the determining that the value is absent from the user profile of the user. Other implementations of this aspect include corresponding systems, apparatus, and computer programs, configured to perform the actions of the methods, encoded on computer storage devices.

These and other implementations may each optionally include one or more of the following features. For instance, actions further include receiving the value among the plurality of values for the attribute from an entity among the plurality of entities associated with the user by the at least one social network service; actions further include receiving a request submitted by the entity among the plurality of entities, the request being for association of the value with the user; actions further include verifying that the entity is authorized to modify the user profile that describes the user, wherein storing the value in the user profile of the user is based on the verifying that the entity is authorized to modify the user profile of the user; actions further include verifying that the user has authorized modification of the user profile that describes the user, wherein storing the value in the user profile of the user is based on the verifying that the user has authorized modification of the user profile; the user profile includes a further attribute having a further value for the further attribute, and determining that the value descriptive of the user is absent from the user profile is based on the further value of the further attribute being included in the user profile; actions further include accessing social network data of the user, the social network data including relationship data representative of social relationships between the user and the plurality of entities associated with the user by the at least one social network service, the social network data including profile data descriptive of the plurality of entities, the profile data including a profile for each of the plurality of entities, the profile data including the attribute within each profile, the profile data including the plurality of values for the attribute, and determining that the value descriptive of the user is absent from the user profile is based on a further profile within the profile data for an entity among the plurality of entities; the social network data is retrieved from a plurality of server machines that provide multiple social network services to the user, the multiple social network services each associating a different subset of the plurality of entities with the user; determining that the value is absent from the user profile includes determining a subset of the plurality of entities that includes the user based on an intensity of interactions between the user and at least one of the plurality of entities; determining that the value is absent from the user profile includes determining a subset of the plurality of entities that includes the user based on a social distance between the user and at least one of the plurality of entities; determining that the value is absent from the user profile includes determining a subset of the plurality of entities that includes the user based on the value being included in each profile of one or more example entities selected by the user from the plurality of entities; determining that the value is absent from the user profile includes determining a subset of the plurality of entities that includes the user based on the value being semantically similar to a different value of the attribute for an entity among the plurality of entities.

Innovative aspects of the subject matter described in this disclosure may be embodied in methods that include the actions of accessing social network data of a user, the social network data including relationship data representative of social relationships between the user and a plurality of entities associated with the user by at least one social network service, the social network data including profile data descriptive of the plurality of entities, the profile data including a profile for each of the plurality of entities, the profile data including an attribute within each profile, the profile data including a plurality of values for the attribute, determining a subset of the plurality of entities, determining being performed by a processor of a machine and based on a particular value of the attribute being included in each profile of one or more example entities selected by the user from the plurality of entities, and storing a representation of the subset of the plurality of entities. Other implementations of this aspect include corresponding systems, apparatus, and computer programs, configured to perform the actions of the methods, encoded on computer storage devices.

These and other implementations may each optionally include one or more of the following features. For instance, actions further include presenting the representation of the subset of the plurality of entities as a cluster of entities similar to the one or more example entities selected by the user; actions further include receiving a selection of at least some of the plurality of entities, the selection identifying the one or more example entities as selected by the user, wherein determining of the subset is in response to the receiving of the selection; actions further include determining a further subset of the plurality of entities, the subset and the further subset each including an entity in common among the plurality of entities, wherein storing of the representation of the subset includes storing representations of the subset and the different subset as overlapping clusters of entities; actions further include retrieving the social network data from a plurality of server machines based on the user being associated with the plurality of entities by multiple social network services, retrieving the social network data including: retrieving the relationship data from at least some of the plurality of server machines, and retrieving the profile data from at least some of the plurality of server machines; the social network data is retrieved from a plurality of server machines that provide multiple social network services to the user, the multiple social network services each associating a different subset of the plurality of entities with the user; a social network service among the multiple social network services associates at least one of the one or more example entities with the user, and determining the subset includes determining the subset to include at least one entity associated with the user by a further social network service among the multiple social network services; the multiple social network services comprise at least two of a contact management service, a micro-blogging service, and a messaging service; determining of the subset of the plurality of entities is based on at least one of an intensity of interaction between the user and at least one of the plurality of entities, and a social distance between the user and at least one of the plurality of entities; actions further include presenting the user with at least one of a suggestion that the particular value of the attribute be stored in a user profile that describes the user, and a recommendation that a message be communicated to each entity in the subset of the plurality of entities; determining the subset of the plurality of entities is based on a determination that a value of the attribute for an entity among the plurality of entities is semantically similar to a different value of the attribute for a different entity among the plurality of entities; actions further include presenting values of one or more attributes for entities in the subset of the plurality of entities, the values being presented within an unstructured arrangement of words pertinent to the subset of the plurality of entities; actions further include: accessing an advertisement associated with an entity in the subset of the plurality of entities, and presenting the advertisement to the user; and actions further include: determining that a live interaction between the user and an entity in the subset of the plurality of entities is occurring, the profile of the entity including a status update for the entity published by the at least one social network service, and presenting the status update for the entity to the user in response to the live interaction.

Innovative aspects of the subject matter described in this disclosure may be embodied in methods that include the actions of receiving a request submitted by a user for identification of a subset of a plurality of entities associated with the user by at least one social network service, the request including the search criterion with which to identify the subset of the plurality of entities, the plurality of entities being described by profile data that includes a profile for each of the plurality of entities and that includes an attribute within each profile, the profile data including a plurality of values for the attribute, determining the subset of the plurality of entities, determining being performed by a processor of a machine and based on a determination that a value of an attribute for an entity among the plurality of entities is semantically similar to the search criterion included in the request, and storing a representation of the subset of the plurality of entities. Other implementations of this aspect include corresponding systems, apparatus, and computer programs, configured to perform the actions of the methods, encoded on computer storage devices.

Innovative aspects of the subject matter described in this disclosure may be embodied in methods that include the actions of accessing social network data of a user, the social network data including relationship data representative of social relationships between the user and a plurality of entities associated with the user by at least one social network service, the social network data including profile data descriptive of the plurality of entities, the profile data including a profile for each of the plurality of entities, the profile data including an attribute within each profile, the profile data including a plurality of values for the attribute, determining a subset of the plurality of entities, determining being performed by a processor of a machine and based on the profile data, the subset including a directly connected entity and an indirectly connected entity among the plurality of entities, the directly connected entity being directly associated with the user by the at least one social network service, the indirectly connected entity being indirectly associated with the user by the at least one social network service, and presenting a value of the attribute for the indirectly connected entity, the presenting being to the user. Other implementations of this aspect include corresponding systems, apparatus, and computer programs, configured to perform the actions of the methods, encoded on computer storage devices.

Innovative aspects of the subject matter described in this disclosure may be embodied in methods that include the actions of identifying an entity based on an indication that a user is aware of the entity, identifying of the entity being performed by a processor of a machine, accessing a profile of the entity, accessing the profile being in response to identifying the entity based on the indication that the user is aware of the entity, the profile of the entity including a status update for the entity published by a social network service, and presenting the status update of the entity to the user, presenting of the status update of the entity being responsive to the identifying of the entity based on the indication that the user is aware of the entity. Other implementations of this aspect include corresponding systems, apparatus, and computer programs, configured to perform the actions of the methods, encoded on computer storage devices.

These and other implementations may each optionally include one or more of the following features. For instance, the indication indicates a query is submitted, the query referencing multiple entities that include the entity, and identifying the entity is based on the indication that the query is submitted; the indication indicates that results of a query are returned in response to the query, the results referencing the entity, and identifying the entity is based on the indication that the results are returned; the indication indicates that a live communication is occurring between the user and the entity, and identifying the entity is based on the indication that the live communication is detected; actions further include: determining a location of the entity, wherein the indication indicates the location of the entity, and identifying of the entity is based on the location of the entity; actions further include: determining a different location that corresponds to the user, wherein the indication indicates the different location of the user, and identifying the entity is based on the location of the entity and the different location of the user; identifying of the entity is based on the location and the different location being within a predetermined threshold distance of each other; identifying the entity is based on the location and the different location being outside a predetermined threshold distance of each other; actions further include: accessing an event of the entity, wherein the indication indicates the event of the entity, and identifying the entity is based on the event of the entity; actions further include: accessing a different event that corresponds to the user, wherein the indication indicates the different event of the user, and identifying the entity is based on the event of the entity and the different event of the user; identifying the entity is based on the event coinciding with the different event; and identifying the entity is based on the event being within a predetermined threshold time of a current time.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Some implementations are illustrated by way of example and not limitation in the figures of the accompanying drawings.

FIG. 20-26 are screenshots illustrating another user interface to present various subsets of socially networked entities, according to some example implementations.

DETAILED DESCRIPTION

Figure 1:
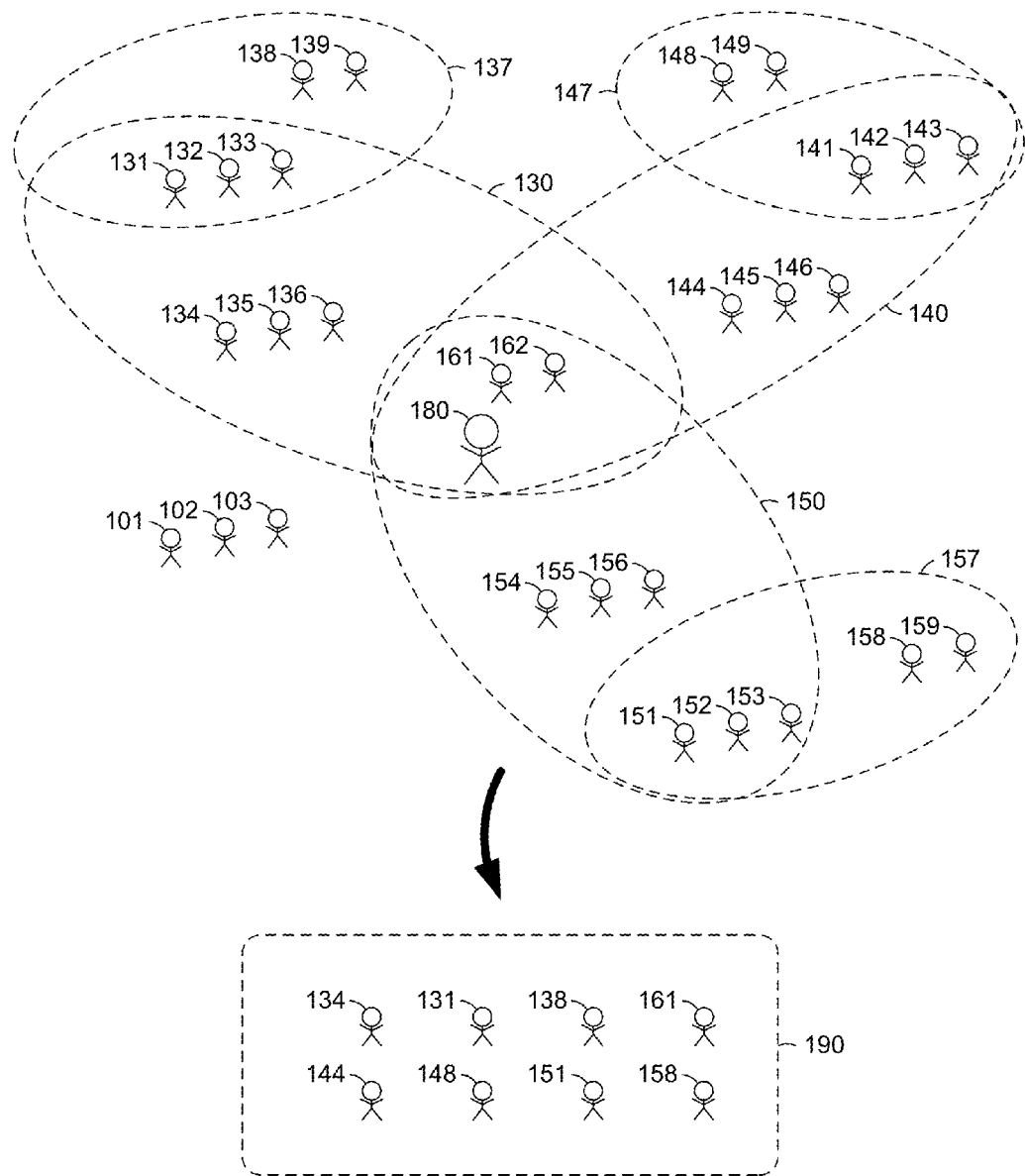
FIG. 1 is a conceptual diagram of socially networked entities and a subset thereof, according to some example implementations.

Example methods and systems are directed to processing socially networked entities. Examples provide implementation variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example implementations. It will be evident, however, that the present subject matter may be practiced without these specific details.

A machine may be configured to process socially networked entities for a user (e.g., process representations of socially networked entities for the user). In particular, the machine may be configured as a subset processing machine to process (e.g., select, determine, identify, present, or communicate with) a subset of the socially networked entities (e.g., by processing a subset of representations of the socially networked entities). A social network of the user may be represented by social network data that includes relationship data and profile data for multiple entities that are associated with the user (e.g., entities that are socially networked with the user) by one or more social network services. For example, different social network services may provide different related services (e.g., interaction services, profile services, or data management services) with respect to at least part of the social network of the user. As the social network services may be provided to the user by multiple server machines, the social network data may be retrieved (e.g., by the machine) from multiple server machines providing the various social network services. Accordingly, the social network data may be retrieved from social network services of different types, for example, from a contact management service, a micro-blogging service, a messaging service, other appropriate computer-implemented services or any suitable combination thereof. Based on the retrieved social network data, the machine may determine a subset of the multiple entities (e.g., a subset of representations of the multiple entities), where the entities in the subset need not be associated with the user by the same social network service. This subset may be processed by the machine to facilitate identifying entities (e.g., by identifying representations of entities), profile management (e.g., managing representations of entities), visualizing social networks, managing interactions, controlling access (e.g., of the user or of an entity socially networked to the user), or any suitable combination thereof.

In the social network data, the relationship data represents social relationships between the user and entities that are associated with the user by at least one social network service. The profile data in the social network data describes (e.g., represents) the entities that are associated with the user. According, the profile data may include representations of those entities. The subset processing machine may retrieve the relationship data and the profile data from multiple server machines providing various social network services to the user. Each entity may have a profile in the profile data, where the profile describes (e.g., represents) the entity. In the profile data, each profile includes an attribute that may have any of multiple values for the attribute (e.g., valid for the attribute).

An attribute and its value for a given entity describe something about the given entity (e.g., a characteristic of the entity). Examples of attributes include a group membership, an affiliation, an interest, contact information, or a descriptor. For example, an attribute may be "phone number," and the value of the attribute may be numerals that constitute a phone number for the entity (e.g., a contact). As another example, an attribute may be "occupation," and the value of the attribute may be a job description or title for the entity (e.g., "doctor," "computer technician," or "student"). As yet another example, an attribute may be "is with a contact of," and the value of the attribute may be a list of identifiers (e.g., names, usernames, or codes) that correspond to other entities who are contacts of the entity. As a further example, an attribute may be "contacts who are single," and the value of the attribute may be a list of identifiers corresponding to entities who are both single and contacts of the entity. As a still further example, an attribute may be "personal interests," and the value of the attribute may be a list of subjects, topics, hobbies, or activities that are of interest to the entity. As a yet further example, an attribute may be "went to high school with," and the value of the attribute may be a list of identifiers corresponding to other entities who were high school classmates of the entity.

Based on the relationship data, the profile data, or both, the subset processing machine may determine and store a subset of the entities associated with the user. In particular, the subset processing machine may determine the subset based on one or more attributes and one or more values of the one or more attributes. The subset processing machine may then present the subset to the user as corresponding to an attribute, the value of the attribute, or any suitable combination thereof. Additionally, further actions may be performed by the subset processing machine with respect to the subset, with respect to an entity in the subset, with respect to the user, based on the subset, or any suitable combination thereof. Examples of further actions are described in detail below.

In some implementations, the profile data and/or the relationship data can be publicly available data. In some implementations, the profile data and/or the relationship data includes data that is authorized by users and/or entities for retrieval, processing and/or other uses discussed herein. In some implementations, users and/or entities can opt into or opt out of participation and/or use of associated data in manners discussed herein.

FIG. 1 is a conceptual diagram of entities 131-136, 138-139, 141-146, 148-149, 151-156, 158-159, and 161-162 and a subset 190 thereof, according to some example implementations. The entities 131-136, 138-139, 141-146, 148-149, 151-156, 158-159, and 161-162 are associated with a user 180, directly or indirectly, by one or more social networks 130, 137, 140, 147, 150, and 157.

As shown, the social network 130 includes the user 180, as well as the entities 131-136 and 161-162. The social network 137 includes the entities 131-133 and 138-139 but does not include the user 180. The social network 140 includes the user 180, as well as the entities 141-146 and 161-162, while the social network 147 includes the entities 141-143 and 148-149, but not the user 180. The social network 150 includes the user 180 and the entities 151-156 and 161-162, while the social network 157 includes the entities 151-153 and 158-159. Each of the social networks 130, 137, 140, 147, 150, and 157 may offer one or more different types of social network services (e.g., contact management, micro-blogging, and/or messaging).

Collectively, the entities 131-136, 138-139, 141-146, 148-149, 151-156, 158-159, and 161-162 may constitute a single (e.g., retrieved) social network of the user 180 (e.g., an extended social network of direct and indirect connections, followers, subscribers, or contacts). As shown, the entities 131-136, 141-146, 151-186, and 161-162 are directly associated with the user 180, while the entities 138-139, 148-149, and 158-159 are indirectly associated with the user 180. Other entities 101-103 exist but are not associated with the user 180, either directly or indirectly, by any social network.

As shown in FIG. 1 by the curved arrow, the subset 190 may be determined from the entities 131-136, 138-139, 141-146, 148-149, 151-156, 158-159, and 161-162. The subset 190 may include one or more entities that are directly connected with the user 180, one or more entities that are indirectly connected with the user 180, or any suitable combination thereof. In some example implementations, the subset 190 contains only entities that are indirectly connected with the user 180. In certain example implementations, the subset 190 contains only entities that are directly connected with the user 180. In the example implementation shown, the subset 190 includes the entities 131 and 134, which are directly associated with the user 180. The subset 190 also may include the entity 138 which is indirectly associated with the user 180. For example, the entity 138 may be a contact of the entity 131, which may be a contact of the user 180. In this example, the entity 138 is associated with the user 180 via the entity 131 (e.g., a common contact).

In the example shown, the subset 190 further includes the entity 144, which is directly associated with the user 180, and also includes the entity 148. The entity 148 is indirectly associated with both the user 180 and the entity 144. For example, the entity 148 may have a contact (e.g., entity 141) in common with the entity 144. In this example, the entity 148 is associated with the user 180 by the overlap of the social network 147 with the social network 140 (e.g., entity 141).

As shown in FIG. 1, the subset 190 additionally includes the entity 151, which is directly associated with the user 180, and also includes the entity 158. The entity 158 is indirectly associated with the user 180 but directly associated with the entity 151. For example, the entity 151 may be a contact shared in common by the user 180 and the entity 158.

Furthermore, the subset 190 may include the entity 161, which is directly associated with the user 180 by multiple social networks 130, 140, and 150. Accordingly, the subset 190 of the entities 131-136, 138-139, 141-146, 148-149, 151-156, 158-159, and 161-162 may include an entity (e.g., entity 138) indirectly associated with the user 180 by a chain of social networks (e.g., social networks 130 and 137), where the chain of social networks may be of any length.

Figure 2:
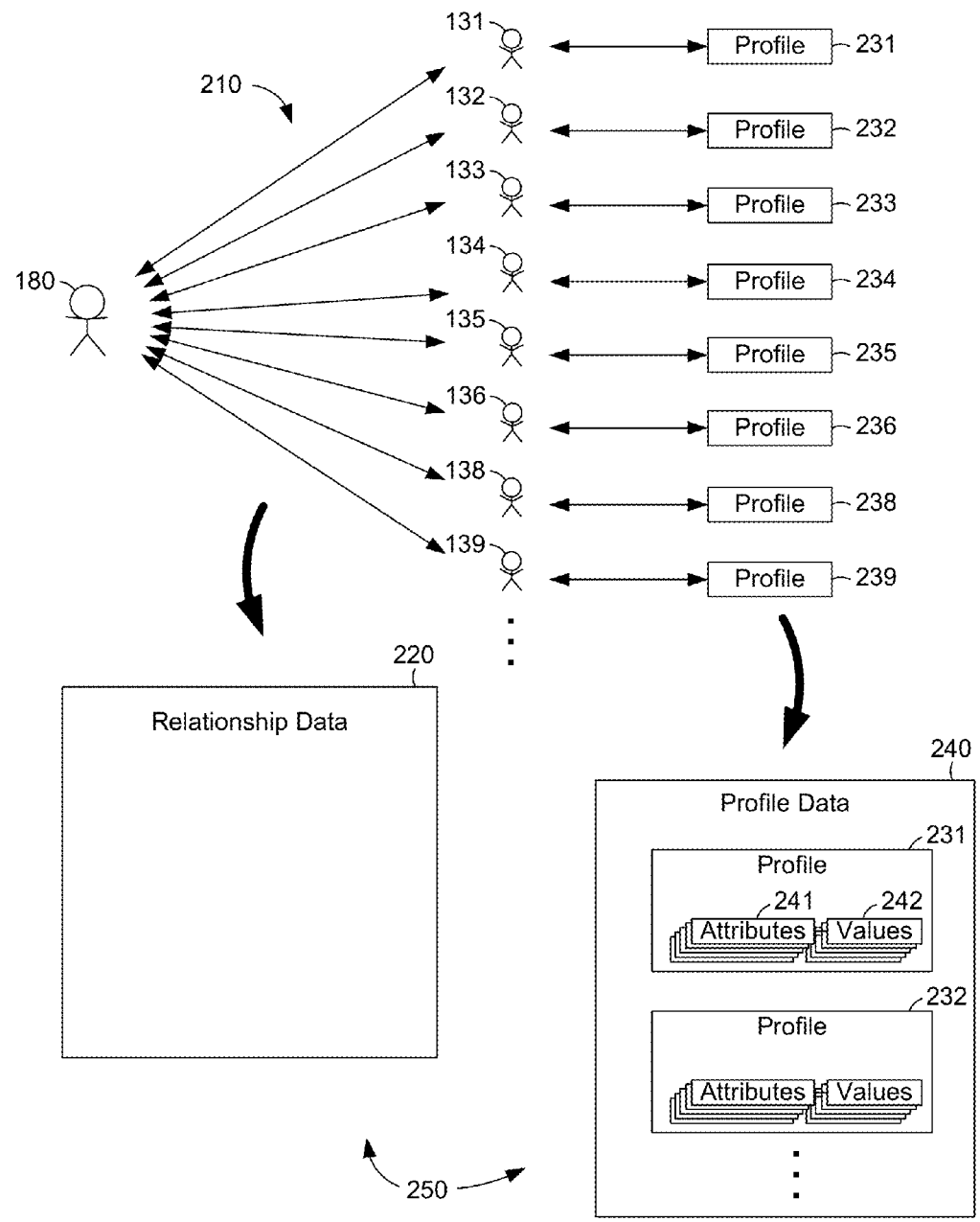
FIG. 2 is a conceptual diagram of social relationships being represented by relationship data and descriptive information of multiple entities being represented by profile data, according some example implementations.

FIG. 2 is a conceptual diagram of social relationships 210 being represented by relationship data 220 and descriptive information of the entities 131-136 and 138-139 being represented by profiles 231-236 and 238-239, according to some example implementations. As used herein, a "profile" of an entity is a body of information that describes (e.g., characterizes) the entity. A profile of an entity may be used to represent the entity (e.g., in determining a set or subset of multiple entities). The relationships 210 may be represented within the relationship data 220 as direct associations or indirect associations (e.g., chains of relationships). Moreover, the relationship data 220 may include details of a relationship between the user 180 and an entity (e.g., entity 138). For example, the relationship data 220 may include details that identify the social networks (e.g., social networks 130 and 137) involved in a chain of social networks associating the user 180 with the entity. As another example, the relationship data 220 may include details that identify one or more entities (e.g., entity 131) that form the chain of social networks associating the user 180 with the entity. Furthermore, the relationship data 220 may be retrieved by the subset processing machine from multiple social networks (e.g., social networks 130, 137, 140, 147, 150, and 157).

As shown in FIG. 2, the entities 131-139 may be described, respectively, by the profiles 231-239 (e.g., representations of entities 131-139, respectively). The profiles 231-239 may be retrieved by the subset processing machine and included in the profile data 240. As with the relationship data 220, the profile data 240 may be retrieved from multiple social networks (e.g., social networks 130, 137, 140, 147, 150, and 157). Shown as a collection of profiles, the profile data 240 includes individual profiles (e.g., profiles 231 and 232), which may be stored as individual profiles. The profile 231, for example, is descriptive of the entity 131 and includes one or more attributes 241, as well as corresponding values 242 of the attributes 241, where the values 242 are descriptive of the entity 131. In combination, the retrieved relationship data 220 and the retrieved profile data 240 form all or part of social network data 250, which may describe all or part of a social network of the user 180.

Figure 3:
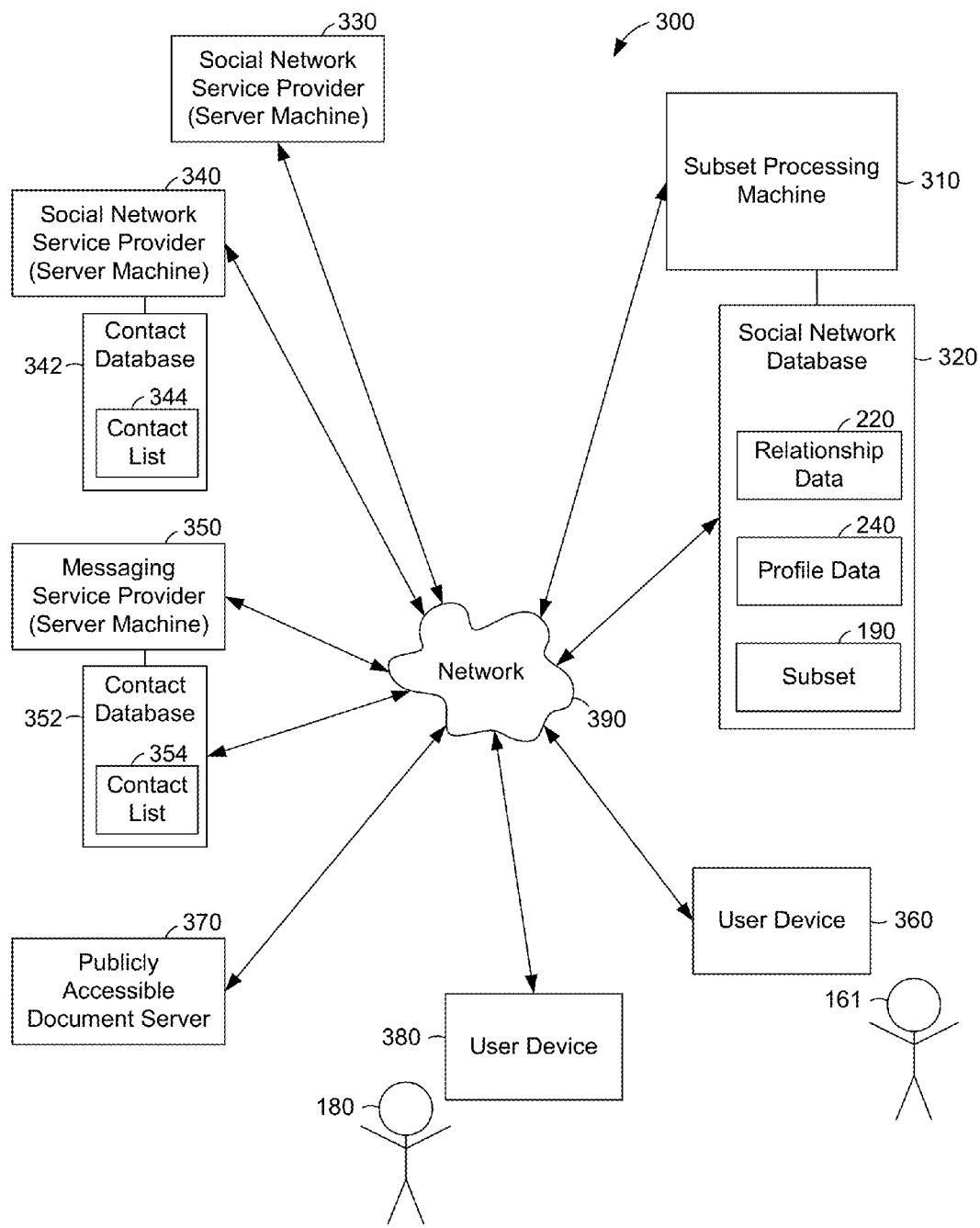
FIG. 3 is a network diagram illustrating a network environment suitable for processing a subset of socially networked entities, according to some example implementations.

FIG. 3 is a network diagram illustrating a network environment 300 suitable for processing the subset 190 of the entities 131-136, 138-139, 141-146, 148-149, 151-156, 158-159, and 161-162, according to some example implementations. The network environment 300 includes a subset processing machine 310, a social network database 320, social network service providers 330 and 340, a messaging service provider 350, a publicly accessible document server 370 (e.g., a web server), and user devices 360 and 380, all communicatively coupled to each other via a network 390. The social network database 320 may be connected to, or part of, the subset processing machine 310. The social network service provider 340 may be connected to a contact database 342, and the messaging service provider 350 may be connected to a contact database 352, which may be directly accessible via the network 390.

As shown in FIG. 3, the contact database 342 stores a contact list 344. Similarly, the contact database 352 stores a contact list 354. As used herein, a contact list is a data structure that stores information usable to address an interaction (e.g., a message) to an entity (e.g., entity 131) as a potential recipient for the interaction. Such information may include, for example, a messaging address or a phone number of that entity, and the contact list may also store additional information that describes the entity (e.g., some or all of the profile 231). Accordingly, an entity referenced in a contact list may be a sender of a message previously communicated to the user 180, a receiver of another message previously communicated from the user 180, a sender or receiver of a further message that mentions the user 180 (e.g., in a list of recipients for the further message, or in the content of the further message).

The social network database 320 stores the relationship data 220, the profile data 240, and the subset 190 of the entities 131-136, 138-139, 141-146, 148-149, 151-156, 158-159, and 161-162. As used herein, storing the subset 190 refers to storing data that defines the subset 190 (e.g., identifies the entities included in the subset 190), as opposed to storing actual entities (e.g., humans or businesses) in the social network database 320. For example, the stored data that defines the subset 190 may be profiles (e.g., representations) of the entities 131, 134, 138, 144, 148, 151, 158, and 161.

Any one or more of the social network service provider 330, the social network service provider 340, the messaging service provider 350, or the publicly accessible document server 370, may be a server machine and accordingly may be implemented in a computer system, as described below with respect to FIG. 11. Similarly, the subset processing machine 310 may be implemented in a computer system, as described below with respect to FIG. 11.

Also shown in FIG. 3 are the user 180 and the entity 161. One or both of the user 180 and the entity 161 may be a human user (e.g., a human being), a machine user (e.g., software program configured to interact with the user device 380), or any suitable combination thereof (e.g., a human assisted by a machine). The user 180 is not part of the network environment 300, but is associated with the user device 380 and may be a user of the user device 380. For example, the user device 380 may be a deskside computer, a tablet computer, or a smart phone belonging to the user 180. Similarly, the entity 161 is not part of the network environment 300, but is associated with the user device 360. As an example, the user device 360 may be a tablet computer belonging to the entity 161.

Any of the machines, databases, or devices shown in FIG. 3 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 11. As used herein, a "database" is a data storage resource and may store data structured as a text file, a table, a spreadsheet, a relational database, a triple store, or any suitable combination thereof. Moreover, any two or more of the machines illustrated in FIG. 3 may be combined into a single machine, and the functions described herein for any single machine may be subdivided among multiple machines.

The network 390 may be any network that enables communication between machines (e.g., subset processing machine 310). Accordingly, the network 390 may be a wired network, a wireless network, or any suitable combination thereof. The network 390 may include one or more portions that constitute a private network, a public network (e.g., the Internet), or any suitable combination thereof.

Figure 4:
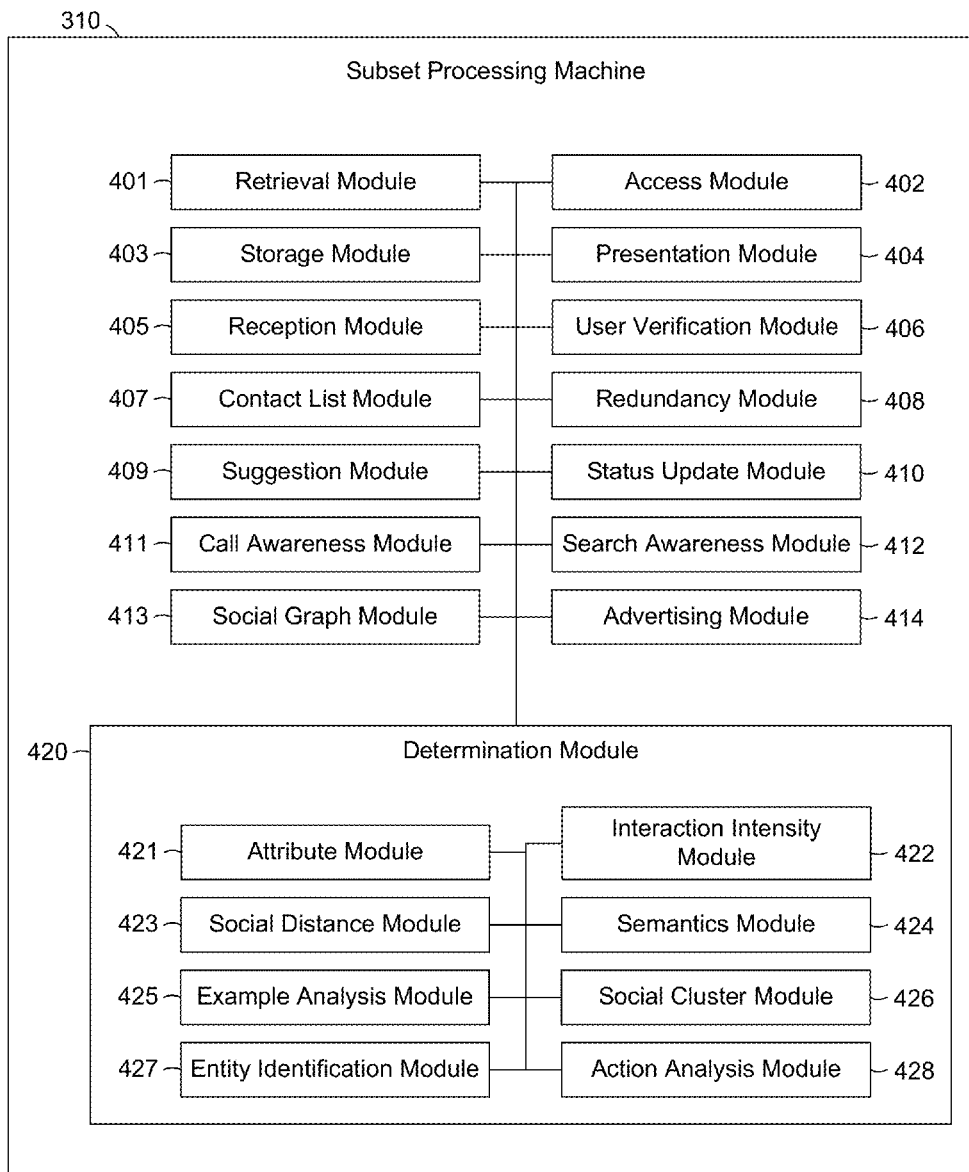
FIG. 4 is a block diagram illustrating components of a subset processing machine configured to process a subset of socially networked entities, according to some example implementations.

FIG. 4 is a block diagram illustrating components of the subset processing machine 310, according to some example implementations. The subset processing machine 310 includes a retrieval module 401, an access module 402, a storage module 403, and a presentation module 404. The subset processing machine 310 also includes a reception module 405, user verification module 406, a contact list module 407, a redundancy module 408, a suggestion module 409, the status update module 410, a call awareness module 411, a search awareness module 412, a social graph module 413, and an advertising module 414. Also included in the subset processing machine 310 is a determination module 420. The determination module 420 includes an attribute module 421, an interaction intensity module 422, a social distance module 423, a semantics module 424, an example analysis module 425, a social cluster module 426, an entity identifying module 427, and an action analysis module 428. Specific functions of the various modules are discussed below with respect to FIG. 5-10.

All modules of the subset processing machine 310 are configured to communicate with each other (e.g., via a bus, shared memory, or a switch). Any one or more of these modules may be implemented using hardware (e.g., a processor of a machine) or a combination of hardware and software. For example, the determination module 420 may be stored in a memory and used to configure a processor of a computer system to perform the functions described herein for the determination module 420. Moreover, any two or more of these modules may be combined into a single module, and the functions described herein for a single module may be subdivided among multiple modules.

FIG. 5-11 are flowcharts illustrating operations in a method 500 of processing the subset 190 of entities 131-136, 138-139, 141-146, 148-149, 151-156, 158-159, and 161-162, according to some example implementations. Operations of the method 500 may be performed by the subset processing machine 310, using modules described above with respect to FIG. 4.

Figure 5:
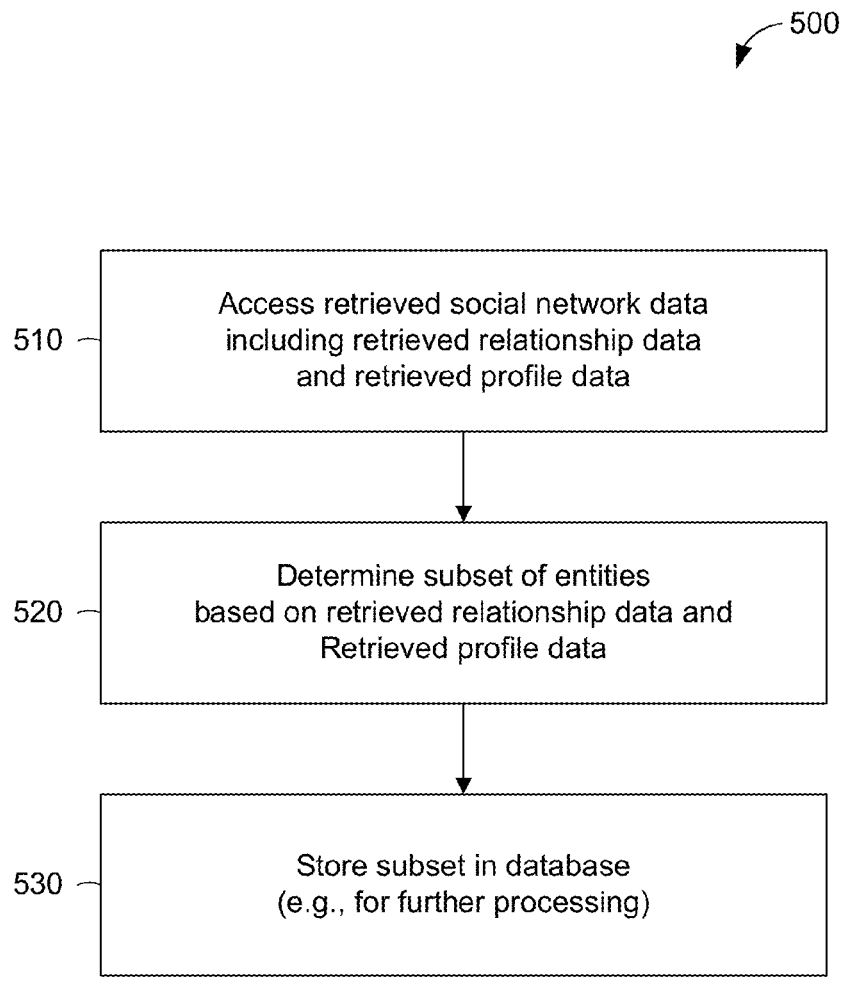
FIG. 5-11 are flowcharts illustrating operations in a method of processing a subset of socially networked entities, according to some example implementations.

As shown in FIG. 5, the method 500 includes operations 510, 520, and 530. In operation 510, the access module 402 accesses the social network data 250, which may be retrieved from multiple server machines (e.g., social network service provider 330 and messaging service provider 350). As noted above, the social network data 250 includes the relationship data 220 and the profile data 240, and the profile data 240 includes a profile (e.g., profile 231) for each entity (e.g., entity 131).

In operation 520, the determination module 420 determines the subset 190 of the entities 131-136, 138-139, 141-146, 148-149, 151-156, 158-159, and 161-162, based on the relationship data 220, the profile data 240, or any suitable combination thereof. For example, the determination module 420 may determine a subset of the profile data 240 (e.g., profiles of the entities 131, 134, 138, 144, 148, 151, 158, and 161 in the subset 190) as being representative of the subset 190. In some example implementations, the determination of the subset 190 includes determining an indication of similarity between or among portions of the profile data 240. For example, operation 520 may include determining an indication of similarity between profile data (e.g., first profile data) of entities directly connected with the user 180 (e.g., entities 134, 135, and 136) and profile data (e.g., second profile data) of entities indirectly connected with the user 180 (e.g., entities 158 and 159). Further details and variants, and extensions of operation 520, according to various example implementations, are described below with respect to FIG. 6-10.

In operation 530, the storage module 403 stores the subset 190 of the entities 131-136, 138-139, 141-146, 148-149, 151-156, 158-159, and 161-162 in the social network database 320. As noted above, storage of the subset 190 involves storing data that defines the subset 190 (e.g., data that identifies the entities included in the subset 190). For example, profiles (e.g., representations) of the entities 131, 134, 138, 144, 148, 151, 158, and 161 may be stored by the storage module 403 in performing operation 530. The subset 190 may be stored for further processing by one or more modules of the subset processing machine 310. In some example implementations, operation 530 is performed by storing data that represents the subset 190 (e.g., as an update to the relationship data 220, the profile data 240, or any suitable combination thereof). For example, operation 530 may include modifying (e.g., updating) the relationship data 220 to indicate that the subset 190 has been determined (e.g., via operation 520) for the user 180.

Figure 6:
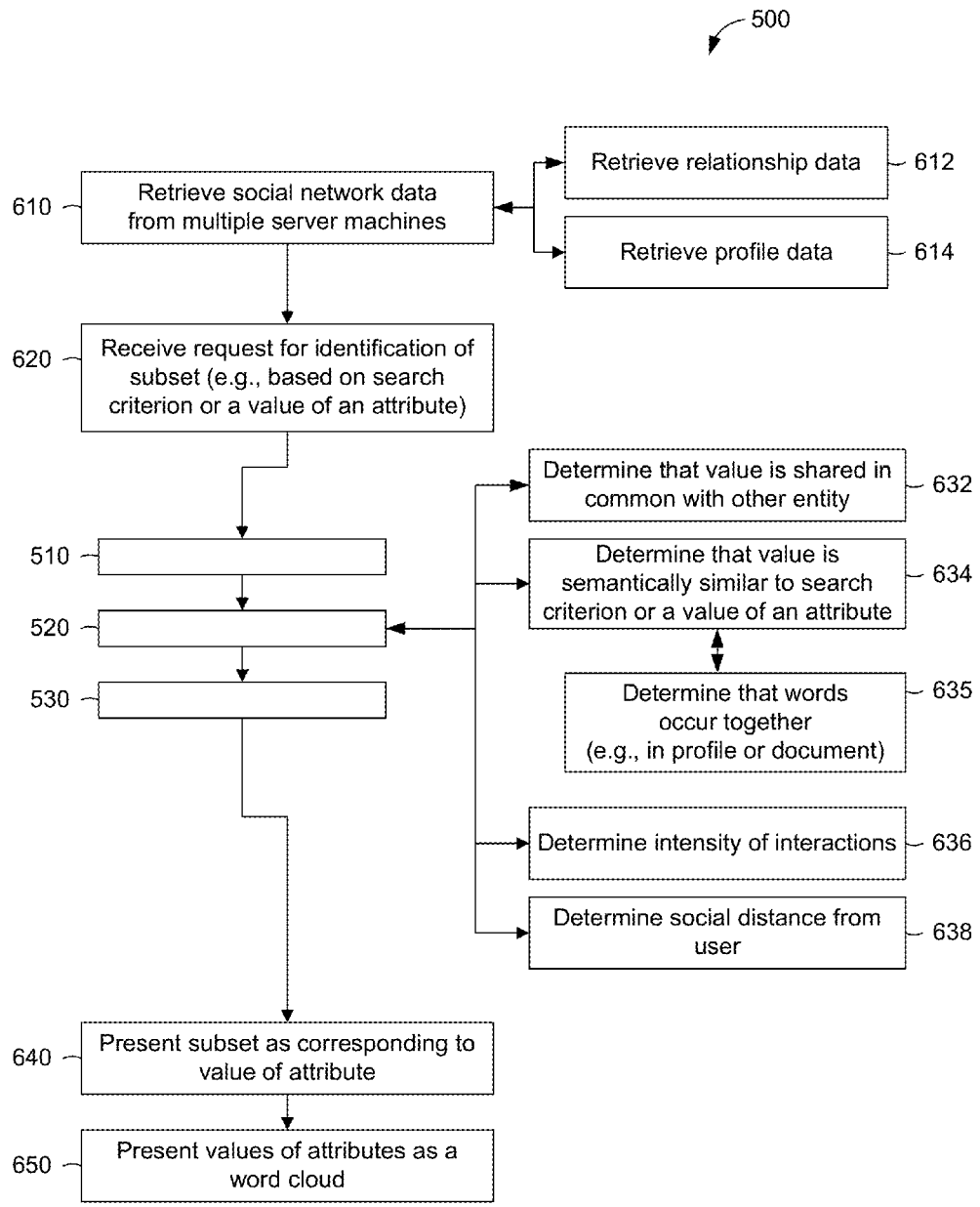

FIG. 6 illustrates some example implementations of the method 500 that include one or more of operations 610-650. In operation 610, the retrieval module 401 retrieves the social network data 250 from multiple server machines. For example, the retrieval module 401 may receive a portion of the social network data 250 that corresponds to the social network 130 via the network 390 from the social network service provider 330. Similarly, the retrieval module 401 may receive a portion of the social network data 250 that corresponds to the social network 140 from the social network provider 340. Likewise, the retrieval module 401 may receive a portion of the social network data 250 that corresponds to the social network 150 from the messaging service provider 350. In some example implementations, operation 610 includes obtaining login credentials (e.g., an identifier and a password of the user 180) and using the login credentials to access (e.g., collect) the social network data 250 or portion thereof.

Moreover, operation 610 may include one or more of operations 612 and 614. In operation 612, the retrieval module 401 retrieves the relationship data 220 from the multiple server machines. In operation 614, the retrieval module 401 retrieves the profile data 240 from the multiple server machines. In other words, retrieving some or all of the social network data 250 may include retrieving some or all of the relationship data 220, some or all of the profile data 240, or any suitable combination thereof, from one or more of these multiple server machines. Accordingly, one or more of operations 610-614 may be implemented as a crawler application that explores (e.g., crawls) the social network of the user 180 and identifies all or part of the relationship data 220, the profile data 240, or any suitable combination thereof.

In operation 620, the reception module 405 receives a request from the user device 380 (e.g., submitted by the user 180). The request may be for identification of at least a portion of the subset 190. In some example implementations, the identification of at least the portion of the subset 190 may be requested to be based on a search criterion (e.g., one or more keywords submitted as query parameters). The search criterion may be received with a request and may coincide with one or more values of one or more attributes. Hence, in certain example implementations, the identification of at least the portion of the subset 190 may be requested to be based on a value of an attribute (e.g., one or more of the values 242), which may be received with the request. This request may be an impetus for the determination of the subset 190 in operation 520, storage of the subset 190 in operation 530, or further actions with respect to the subset 190 as described below (e.g., operations 640 and 650).

One or more of operations 632, 634, 636, or 638 may be included in operation 520, in which the determination module 420 determines the subset 190. In operation 632, the attribute module 421 within the determination module 420 determines that a value of an attribute for an entity (e.g., entity 131) is shared in common with another entity (e.g., entity 134). In other words, the attribute module 421 may determine that multiple entities share the same value for a particular attribute. Accordingly, the determination module 420 may determine the subset 190 based on this determination that a value for one entity is shared in common with another entity. For example, the subset 190 may be determined (e.g., defined) as including all entities that share the value of the attribute within the social network of the user 180 (e.g., all entities with the value "soccer" for the attribute "sports interest," or all entities with the value "George Smith" for the attribute "is with a contact of," or all entities with the value "single" for the attribute "marital status").

In operation 634, the semantics module 424 of the determination module 420 determines that a value for an attribute is semantically similar to a search criterion (e.g., received in operation 620), another value for the attribute (e.g., received in operation 620), or any suitable combination thereof. This determination may be used by the attribute module 421 to determine that multiple entities share a semantically similar value for a particular attribute or that multiple entities have the values of an attribute that are semantically similar to a search criterion. Accordingly, the determination module 420 may determine the subset 190 based on a determination that a value of an attribute for one entity is semantically similar to the search criterion, another value of the same attribute for another entity, or any suitable combination thereof. For example, the subset 190 may be determined as including all entities with the value "boats" or the semantically similar value "yachts" for the attribute "favorite recreational vehicle." As another example, the semantics module 424 may determine that the values "Porsche 911," "911 Carrera," and "911 Targa" are semantically similar to each other, and the determination module 420 may determine the subset 190 to include all entities having these values for the attribute "car." As a further example, the semantics module 424 may determine that the value "vegan" (e.g., for the attribute "dietary restriction") is semantically similar to the keyword "vegetarian" submitted as a search criterion (e.g., to identify entities that are vegetarians or likely to be vegetarians).

According to various example implementations, the semantics module 424 is configured to analyze one or more indications included in the request received in operation 620. Based on this analysis, the semantics module 424 may determine that the user 180 is likely to hold an intention to perform a speech act upon the subset 190 after the subset 190 is identified (e.g., via operation 520, operation 530, or both). As used herein, a "speech act" is an interaction (e.g., to the entities in the subset 190) that serves a function or purpose (e.g., an intention held by the user 180). The request received in operation 620 may include an indication from which the semantics module 424 may infer an intention to perform a speech act. For example, the request may include an indication that the user 180 intends to share information (e.g., a news article) with the subset 190, after the subset 190 is identified. As another example, the request may include an indication that the user 180 intends to seek expertise from (e.g., ask a question of) the subset 190, after the subset 190 is identified. As a further example, the request may include an indication that the user 180 intends to provide expertise to (e.g., teach) the subset 190, after the subset 190 is identified. In such cases, operation 520 may be performed based on one or more of these indications included in the request.

Operation 634 may include operation 635. In operation 635, the semantics module 424 determines that multiple values (e.g., different words) occur together as semantically similar values (e.g., semantically similar words). The multiple values may occur together (e.g., co-occur) in a profile (e.g., profile 231), in a document (e.g., a publicly accessible document), or any suitable combination thereof. For example, the semantics module 424 may access the profile data 240 and read the profile 231, in which the words "boats" and "yachts" both occur. Based on the profile 231, the semantics module 424 determines that "boats" and "yachts" are semantically similar to each other. As another example, the semantics module 424 may access the publicly accessible document server 370 and retrieve a publicly accessible document (e.g., a crowd-sourced encyclopedic web page), within which the word "yacht" is described as a type of "boat." Based on the publicly accessible document, the semantics module 424 determines that "boats" and "yachts" are semantically similar to each other.

In operation 636, the interaction intensity module 422 of the determination module 420 determines a value of an attribute that represents an intensity of interactions by an entity (e.g., entity 131) with the user 180. This may be performed for multiple entities (e.g., entities 131-136, 138-139, 141-146, 148-149, 151-156, 158-159, and 161-162). Accordingly, the determination module 420 may determine the subset 190 based on one or more values representing intensities of interactions with the user 180. In determining a value for an intensity of interactions, the interaction intensity module 422 may access information describing a frequency of contact with the user 180, a length of a particular interaction (e.g., an electronic message, voicemail, text message, or posting) directed to the user 180, an average length of interactions with the user 180, content of a particular interaction with the user 180, or any suitable combination thereof. As a result, the determination module 420 may determine the subset 190 as including, for example, all entities that communicate daily with the user 180. As another example, the subset 190 may include all entities that have sent a message over 200 words long to the user 180. As a further example, the subset 190 may include all entities that have received a message over 100 words long from the user 180. As a still further example, the subset 190 may include all entities whose interactions with the user 180 have mentioned "7th Street Buddhist Temple" but not "Buddhism."

In operation 638, the social distance module 423 of the determination module 420 determines a value of an attribute that represents a social distance of an entity (e.g., entity 131) from the user 180. This may be performed for multiple entities (e.g., entities 131-136, 138-139, 141-146, 148-149, 151-156, 158-159, and 161-162). Accordingly, the determination module 420 may determine the subset 190 based on one or more values representing social distances from the user 180. In determining a value for a social distance, the social distance module 423 may access information (e.g., stored in a profile of the entity) that indicates a degree of closeness of the entity to the user 180, an extent of trust between the entity and the user 180, a level of respect for the entity by the user, a level of respect for the user by the entity, a number of other entities designated as contacts shared in common by the user 180 and by the entity, a personal interest designated as shared in common by the user 180 and by the entity, a number of personal interests shared between the user 180 and the entity, or any suitable combination thereof. As a result, the determination module 420 may determine the subset 190 as including, for example, all entities that are family members of the user 180 or all entities that are close contacts of multiple family members of the user 180. As another example, the subset 190 may include all entities that have received designations from the user 180 as being trusted to receive personal information of the user 180. As another example, the subset 190 may include all entities that have communicated with the user 180 on a topic for which the user 180 has special expertise. As a further example, the subset 190 may include all entities that have more than three contacts shared in common with the user 180. As a still further example, the subset 190 may include all entities that share an interest in "motorcycles" with the user 180. As a yet further example, the subset 190 may include all entities that have more than five values for the attribute "philosophical influences" shared in common with the user 180.

In operation 640, the presentation module 404 presents the subset 190 (e.g., data defining the subset 190). Presentation of the subset 190 may be to the user 180 (e.g., via a display of the user device 380), and the subset 190 may be presented as corresponding to one or more values (e.g., values 242) of an attribute. For example, the presentation module 404 may present the subset 190 a response to the request received in operation 620 for identification of the subset 190, and the subset 190 may be presented as corresponding to the one or more values requested as a basis for the identification of the subset 190. As another example, where the determination of the subset 190 in operation 520 is based on an intensity of interaction (e.g., as determined in operation 636), the subset 190 may be presented as corresponding to that intensity of interaction. As yet another example, where the determination of the subset 190 is based on a social distance (e.g., as determined in operation 638), the subset 190 may be presented as corresponding to that social distance. Operation 640 may be performed in response to the request received in operation 620.

In operation 650, the presentation module 404 presents one or more values of one or more attributes for entities in the subset 190 in an unstructured arrangement (e.g., a graphical layout within a document, a webpage, or a display) that is specific to the subset 190. The presentation of the one or more values may be made to the user 180 (e.g., via the user device 380). Where the values include words, the unstructured arrangement may be a word cloud that presents words pertinent to (e.g., descriptive of, specific to, or corresponding to) entities in the subset 190 (e.g., entities 131, 134, and 138). Operation 650 may be performed in response to the request received in operation 620.

Figure 7:
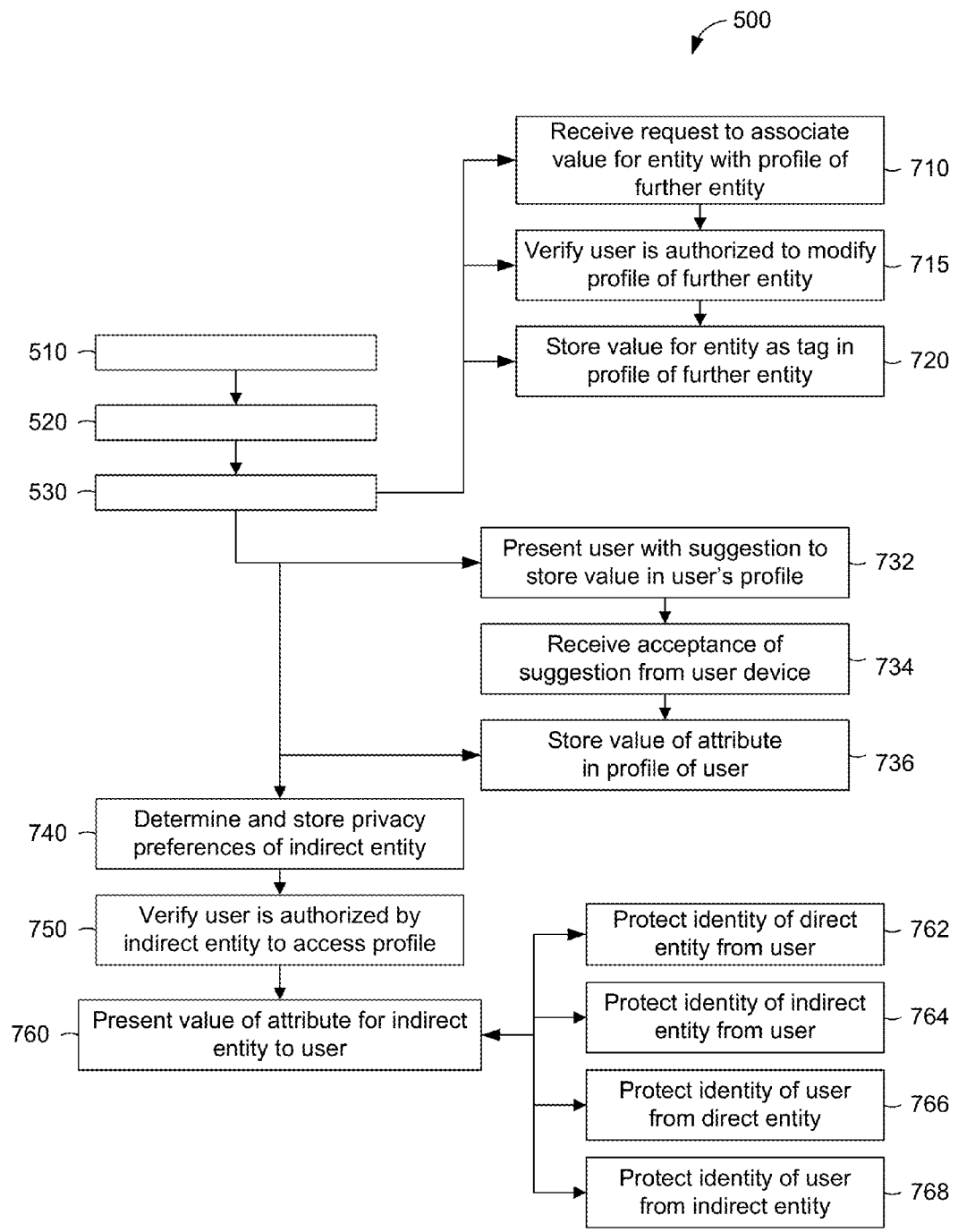

FIG. 7 illustrates some example implementations of the method 500 that include one or more of operations 710-768. In operation 710, the reception module 405 receives a request from the user device 380 (e.g., submitted by the user 180). The request is for association of a value of an attribute for an entity (e.g., entity 131) in the subset 190 with the profile of a further entity (e.g., entity 134). The further entity may be present or absent from the subset 190. The value of the attribute may be a descriptor (e.g., a tag) pertinent to the entity, to the further entity, or to both. In other words, the user 180 may request that a tag which is currently applied to the profile of one entity (e.g., entity 131) within the subset 190 be also applied to the profile of another entity (e.g., entity 134) within the subset 190. For example, the subset 190 may include all entities that share the same value for the attribute "work address," and yet only some of the entities in the subset 190 may be tagged with a business name (e.g., "Bob's Sporting Goods") that corresponds to that work address. Accordingly, the user 180 may request that an entity (e.g., entity 134) that is in the subset 190, but has no value for "work address," be tagged with the business name as the value for the attribute "work address" in the profile for that entity. As another example, the further entity (e.g., entity 101) may be absent from the subset 190, as determined in operation 520, but the user 180 may nonetheless request that a tag from an entity (e.g., entity 131) within the subset 190 be applied to the profile of the further entity.

In operation 715, the user verification module 406 verifies that the user 180 is authorized to modify the profile of the further entity (e.g., entity 134). In some implementations, the user verification module 406 may access information indicating preferences, privacy settings, or both, for the further entity, and the verification that the user 180 is authorized to modify the profile may be based on this accessed information. In some example implementations, operation 715 is performed in response to operation 710, while in other example implementations, operation 715 is performed without operation 710 being performed.

In operation 720, the storage module 403 stores a value of an attribute for one entity (e.g., entity 131) in the profile of another entity (e.g., entity 134), which may be stored in the social network database 320 (e.g., within the profile data 240). According to some example implementations, operation 720 is performed in response to operation 710, operation 715, or any suitable combination thereof. In other example implementations, operation 720 is performed automatically and without operations 710 and 715 being performed. For example, operation 720 may be performed in accordance with preferences set by the user 180.

In operation 732, the suggestion module 409 presents the user 180 (e.g., via the user device 380) with a suggestion that a value of an attribute shared in common by the profiles of at least some entities (e.g., entities 131 and 134) in the subset 190 be stored in a profile of the user 180 (e.g., as part of the profile data 240 in the social network database 320). For example, the subset 190 may include all entities with which the user 180 communicated on a weekday, and the profile of the user 180 may have no value for the attribute "occupation," while many entities in the subset 190 have the value "Engineer" for that attribute. Accordingly, the suggestion module 409 may present the user 180 with a suggestion that the value "Engineer" be stored in the profile of the user 180. This may have the effect of drawing an inference that the user 180 shares that value in common with other entities in the subset 190.

In operation 734, the reception module 405 receives an acceptance of the suggestion from the user device 380 (e.g., submitted by the user 180). The acceptance of the suggestion may provide a basis for storing the suggested value of the attribute in the profile of the user 180.

In operation 736, the storage module 403 stores a value of an attribute in the profile of the user 180. The profile of the user 180 may be stored in the profile data 240 within the social network database 320. As noted in the discussion of operations 732, the value may be shared in common by the profiles of at least some entities (e.g., entities 131 and 134) in the subset 190. This may have the effect of automatically tagging or otherwise creating descriptive information about the user 180. In some example implementations, operation 736 is performed in response to operation 732, operation 734, or any suitable combination thereof. According to other example implementations, operation 736 is performed automatically and without operations 732 and 734 being performed. For example, operation 736 may be performed in accordance with preferences set by the user 180. In some example implementations, the value of the attribute is stored in a profile of the user 180 maintained by a social networking service (e.g., the social networking service from which part or all of the social networking data 250 is retrieved in operation 610).

Operations 740-760 may be included in the example implementations that provide the user 180 with access to a profile of an indirectly associated entity (e.g., entity 138). An "indirectly associated entity" is an entity that, according to the relationship data 220, is absent from social networks that include the user 180. The indirectly associated entity may be called an "indirect entity" or an "indirectly connected entity" for convenience. A "directly associated entity" (e.g., entity 131) is an entity that, according to the relationship data 220, is present in the at least one social network that includes the user 180. A directly associated entity may be called a "direct entity" or a "directly connected entity" for convenience.

In operation 740, the attribute module 421 of the determination module 420 determines and stores one or more preferences (e.g., data access preferences) of an indirect entity (e.g., entity 138) with respect to the user 180. The one or more preferences may be determined based on the subset 190 determined in operation 520 (e.g., based on inclusion of the indirect entity in the subset 190. For example, the subset 190 may include all entities having the same value for the attribute "school," and the one or more preferences for the entity 138 may be determined to be the same or similar to preferences for other entities in the subset 190. The one or more preferences may be stored in the profile of the user 180 (e.g., in the profile data 240 within the social networking database 320).

In operation 750, the user verification module 406 verifies that the user 180 is authorized by the indirect entity (e.g., entity 138) to access the profile of the indirect entity (e.g., access a value of an attribute in the profile of the indirect entity). The verification that the user 180 is authorized may be based on one or more preferences of the indirect entity, which may be determined in operation 740 or which may be set by the indirect entity. According to some example implementations, the verification that the user 180 is authorized may be based on the subset 190. For example, entities (e.g., entities 131 and 134) in the subset 190 may be authorized to access the profile of the indirect entity, and the user verification module 406 may determine that the user 180 is similarly authorized (e.g., based on other values shared in common among the user 180 and the entities in the subset 190). This may have the effect of facilitating automatic access control or automatic suggestions for access control with respect to the profile of the indirect entity.

In operation 760, the presentation module 404 presents a value of an attribute for the indirect entity to the user 180 (e.g., via the user device 380). Operation 760 is performed in response to a request for the value of the attribute (e.g., from the user device 380, as submitted by the user 180). In some example implementations, operation 760 is performed based on the one or more preferences determined and stored in operation 740, on the verification performed in operation 750, or on any suitable combination thereof. In other example implementations, operation 760 is performed without operations 740 and 750 being performed.

One or more of operations 762-768 may be included in operation 760. In operation 762, the presentation of the value to the user 180 occurs in conjunction with protecting an identity of the direct entity (e.g., entity 131) from the user 180 (e.g., withholding an identifier, name, or username of the direct entity). In operation 764, the presentation occurs in conjunction with protecting an identity of the indirect entity (e.g., entity 138) from the user (e.g., withholding identifier, name, or username of the indirect entity). One or more of operations 762 and 764 may be performed in accordance with a preference of the indirect entity, of the direct entity, or both.

In operation 766, the presentation of the values to the user 180 occurs in conjunction with protecting an identity of the user 180 from the direct entity (e.g., entity 131). For example, an identifier, name, or username of the user 180 may be withheld from the direct entity. In operation 768, the presentation occurs in conjunction with protecting an identity of the user from the indirect entity (e.g., entity 138). As an example, an identifier, name, or username of the user 180 may be withheld from the indirect entity. One or more of operations 766 and 768 to be performed in accordance with a preference of the user 180, of the direct entity, or both.

Figure 8:
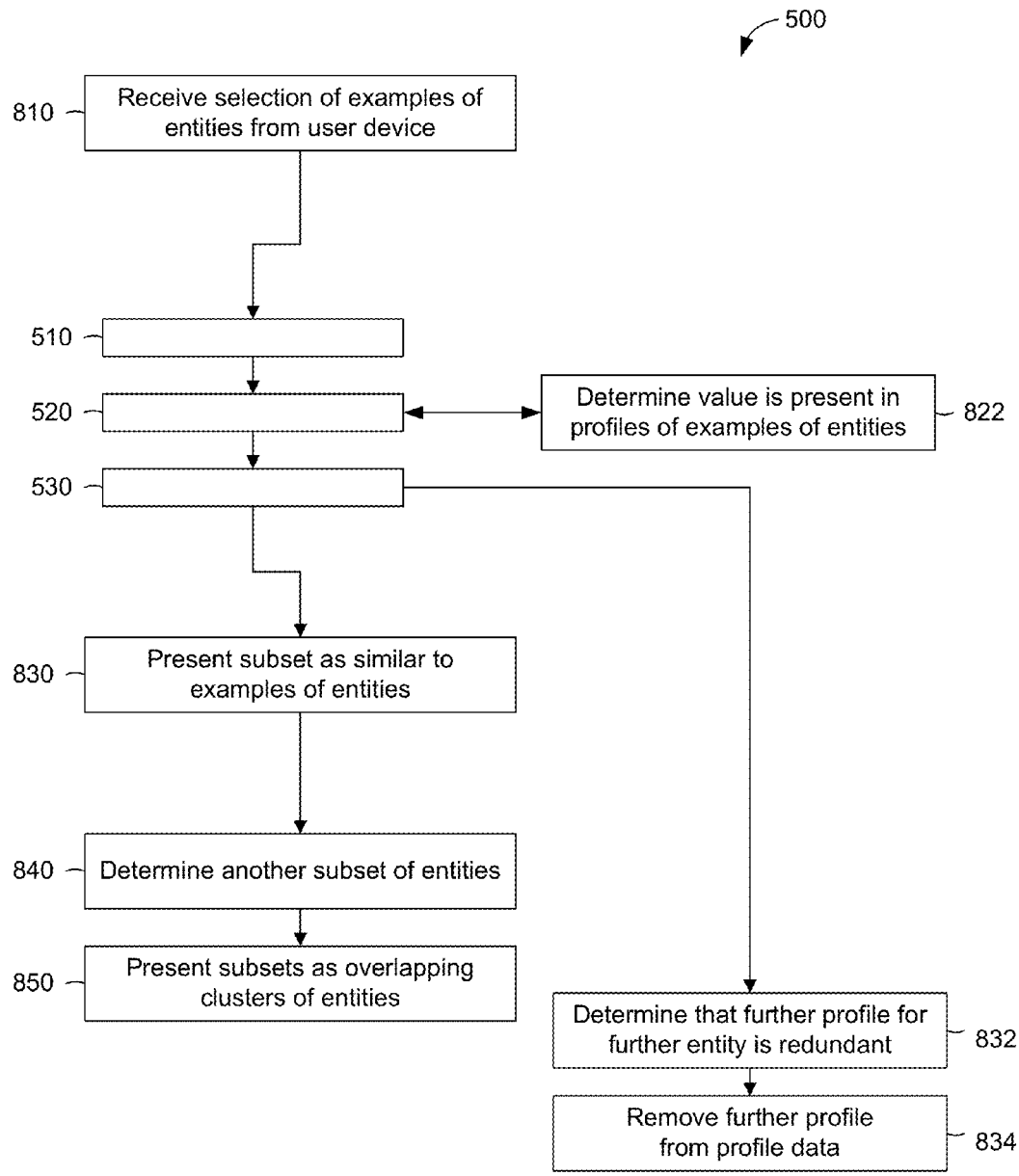

FIG. 8 illustrates some example implementations of the method 500 that include one or more of operations 810-850. In operation 810, the reception module 405 receives a selection of one or more examples of entities (e.g., entities 131 and 134). The selection may be received from the user device 380 (e.g., submitted by the user 180). The reception module 405 may receive the selection along with a request to identify the subset 190 based on the examples of entities, as identified in the selection.

Operation 822 may be included in operation 520, in which the subset 190 is determined by the determination module 420. In operation 822, the example analysis module 425 of the determination module 420 determines that a value of an attribute is present in profiles of the examples identified in the received selection. In other words, the example analysis module 425 may determine one or more values shared in common by entities (e.g., entities 131 and 134) selected as examples for determining the subset 190. Accordingly, the determination module 420 may determine the subset 190 in operation 520 based on the one or more values shared in common by the entities selected as examples. This may have the effect of facilitating completion of a set of entities (e.g., subset 190) based on a relatively small number of example entities. In some example implementations, the example entities are associated with the user 180 by a particular social network (e.g., social network 130), and the subset 190 is determined to include one or more entities associated with the user 180 by the same social network. In various example implementations, the example entities are associated with the user 180 by one social network (e.g., social network 130), and the subset 190 is determined to include one or more entities associated with the user 180 by another social network (e.g., social network 140).

In operation 830, the presentation module 404 may present the subset 190 as a set of entities that are similar to the examples identified by the selection received in operation 810 (e.g., examples selected by the user 180). Operations 822 and 830 may be performed in response to operation 810. In some example implementations, operations 822 and 830 may be performed in response to identification of any one or more of the entities 131-136, 138-139, 141-146, 148-149, 151-156, 158-159, and 161-162. For example, where the user 180 sends party invitations to the entities 134 and 144, operations 822 and 830 may be performed to provide the user 180 with suggestions for additional invitees to the party, based on the subset 190.

In operation 840, the determination module 420 determines another subset (e.g., different from the subset 190) of the entities 131-136, 138-139, 141-146, 148-149, 151-156, 158-159, and 161-162. In other words, multiple subsets may be determined by the subset processing machine 310, using one or more of the functionalities described herein. In some example implementations, multiple subsets may include an entity in common (e.g., entity 162).

In operation 850, the social cluster module 426 of the determination module 420 generates the presentation of the multiple subsets as overlapping clusters of entities, and the presentation module 404 presents this presentation to the user 180 (e.g., via the user device 380). For example, the presentation may define the multiple subsets, identify the entities included in each of the multiple subsets, or any suitable combination thereof. This may have the effect of showing the user 180 at least some of the entities 131-136, 138-139, 141-146, 148-149, 151-156, 158-159, and 161-162 arranged (e.g., clustered) into overlapping groups. Accordingly, the user 180 may obtain a convenient overview of her social network.

Operations 832 and 834 may be performed anytime after operation 520. For example, as shown in FIG. 8, operations 832 and 834 may be performed after operation 530. In operation 832, the redundancy module 408 determines that multiple profiles for multiple entities in the subset 190 are redundant (e.g., duplicates). For example, the redundancy module 408 may determine that a profile for an entity (e.g., entity 131) and a further profile for a further entity (e.g., entity 134) actually describe the same entity (e.g., the same person or business). This determination may be based on a number of attributes having the same or similar (e.g., semantically similar) values in both profiles. In some example implementations, operation 832 includes marking at least one of the multiple profiles as a redundant profile. The marking may occur within the subset 190 (e.g., data identifying the subset 190) stored in the social network database 320. In some example implementations, the marking occurs within the profile data 240, as stored in the social network database 320.

In operation 834, the redundancy module 408 removes one or more profiles determined in operation 832 to be redundant. The one or more profiles may be removed from the profile data 240, while leaving intact at least one of the redundant profiles to continue describing the corresponding entity. The removal may be based on the determination performed in operation 832. In some example implementations, the redundancy module 408 merges the redundant profiles prior to any removal of profiles. This may have the effect of removing duplicate entities from the social network of the user 180.

Figure 9:
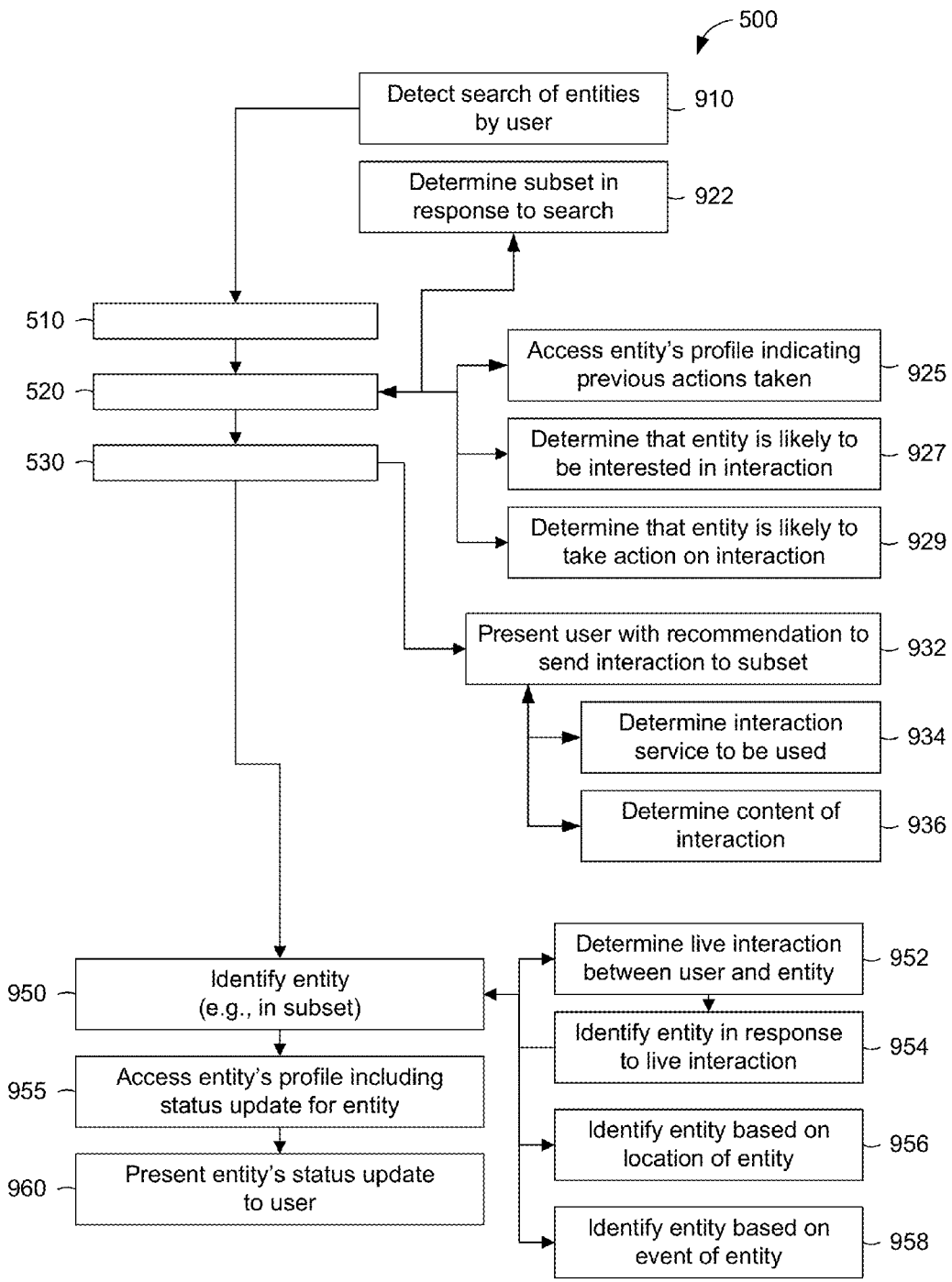

FIG. 9 illustrates some example implementations of the method 500 that include one or more of operations 910-960. In operation 910, the search awareness module 412 can become aware of initiation of a query that searches through at least some of the entities 131-136, 138-139, 141-146, 148-149, 151-156, 158-159, and 161-162. For example, a query may be submitted from the user device 380 to a search engine communicatively coupled to the search awareness module 412, and the search awareness module 412 may be made aware that the user 180 has submitted a search of one or more entities in her social network.

Operation 922 may be included in operation 520, in which the subset 190 is determined by the determination module 420. In example implementations that include operation 922, operation 520 is performed in response to awareness of a query (e.g., as performed in operation 910). Moreover, when operation 922 is included, operation 520 may determine the subset 190 based on the query. For example, the subset 190 may be determined to include all entities returned as results of the query.

In operation 950, the entity identification module 427 of the determination module 420 identifies an entity (e.g., entity 131). For example, the entity identifying module 427 may identify an entity that is within the subset 190 (e.g., entity 131). In some example implementations, the entity identified is outside the subset 190 (e.g., entity 136). The identification of the entity may be based on the query provided in operation 910, results of the query provided in operation 910, awareness of a interaction (e.g., a live interaction) between the user 180 and the entity, a location of the entity, a different location of the user 180, an event of the entity (e.g., a calendar event), a different event of the user 180, or any suitable combination thereof. Accordingly, the entity identifying module 427 may identify the entity based on an indication that the user 180 is aware of the entity (e.g., an indication that the user 180 is experiencing awareness, contemplation, consciousness, recall, or discovery of the entity). In some example implementations, the indication is generated (e.g., by the entity identifying module 427) as part of operation 950. In certain example implementations, the indication is received (e.g., by the entity identifying module 427 from the user device 380 or the user device 360) as part of operation 950.

The indication may be true or accurate (e.g., based on the user 180 initiating an interaction with the entity or receiving an interaction from the entity), or likely to be true or accurate (e.g., based on the user 180 and the entity being scheduled to attend the same event), or merely possible (e.g., based on the user 180 and the entity being within a predetermined physical proximity to each other). For example, the entity may be identified when the entity places a phone call to the user 180, when the user 180 sends a text message to the entity, when the entity and the user 180 enter the same conference call, when the entity (e.g., according to location data of the entity) moves within a certain proximity to the user 180, when the entity is scheduled to attend an upcoming event with the user 180, or any suitable combination thereof. Based on such an indication of awareness of the entity, the entity identifying module 427 may identify the entity (e.g., for presenting to the user 180 a status update of the entity).

In operation 955, the status update module 410 accesses a profile of the entity identified in operation 950 (e.g., as stored in the profile data 240 within the social network database 320). In some example implementations, the profile of the entity includes a status update for the entity (e.g., "eating lunch at the beach").

In operation 960, the presentation module 404 presents at least some of the status update for the entity to the user 180 (e.g., via the user device 380). This may have the effect of providing the user 180 with current information about the entity, at a time when information regarding the entity is likely to be of special interest to the user 180 (e.g., during or shortly after a search that locates the entity, or during or shortly after a live interaction with the entity).

In some example implementations, operation 950 includes one or more of operations 952, 954, 956, and 958. In operation 952, the call awareness module 411 can become aware of an interaction (e.g., a live interaction) between the user 180 and the entity (e.g., entity 131). The interaction may be a live interaction. A live interaction is a real-time or near-real-time exchange of information between the user 180 and the entity, and a live interaction may include other entities beyond the user 180 and the entity. For example, the live interaction may be a telephone call, a voice over Internet Protocol (IP) conversation, a teleconference, a video call, an Internet chat, an instant text message, or any suitable combination thereof. Awareness of the live interaction may provide an impetus for determining the subset 190 in operation 520. According to various example implementations, the entity may be an entity within the subset 190 (e.g., entity 131). According to other example implementations, the entity is outside of the subset 190 (e.g., entity 136). In certain example implementations, the interaction is an asynchronous (e.g., non-live) interaction, such as, an electronic message or a posting of a comment. The interaction may be initiated by the user 180 or by the entity (e.g., entity 131).

In example implementations that include operation 954, operation 950 is performed in response to awareness of the interaction performed in operation 952. Moreover, when operation 952 is included, operation 950 may identify the entity based on the conversation. For example, the entity may be identified based on information used to address or initiate the interaction (e.g., a phone number or username).

In example implementations that include operation 956, the entity identifying module 427 is configured to determine a location of an entity (e.g., an entity among the subset 190, or an entity outside the subset 190) and determine a different location that corresponds to the user 180. Hence, the entity identifying module 427 may operate as a location awareness module (e.g., by processing global positioning system (GPS) data of the user 180, the entity whose location is determined, or both). In operation 956, the entity identifying module 427 identifies the entity based on the determined location of the entity. For example, the entity may be identified when the entity's determined location is within a predetermined threshold distance of the user 180 (e.g., a different location that corresponds to the user 180). As another example, the entity may be identified when the entity's determined location is outside a predetermined threshold distance from the user 180. In some example implementations, the determined location of the entity is evaluated against multiple threshold distances by the entity identifying module 427 (e.g., a minimum distance and a maximum distance from a location of the user 180). According to various example implementations, the location of the entity, the location of the user 180, or both, are physical (e.g., GPS coordinates). In certain example implementations, the location of the entity, the location of the user 180, or both, are non-physical (e.g., coordinates within a virtual world).

In example implementations that include operation 958, the entity identifying module 427 is configured to access an event (e.g., a scheduled event in a calendar) of an entity (e.g., an entity among the subset 190, or an entity outside the subset 190). Hence, the entity identifying module 427 may operate as an event access module (e.g., by reading calendar data of the user 180, of the entity whose event is accessed, or both). In operation 958, the entity identifying module 427 identifies the entity based on the accessed event of the entity. For example, the entity may be identified when the entity's event coincides with an event of the user 180 (e.g., when the user 180 and the entity of our scheduled to attend the same event), when the entity's event is within a predetermined threshold time of the current time (e.g., when a meeting between the user 180 and the entity is two days away), or any suitable combination thereof. In some example implementations, the accessed event of the entity is evaluated against multiple threshold times by the entity identifying module 427 (e.g., a minimum time and a maximum time from the current time).

One or more of operations 925-932 may be implemented in example implementations that feature some intelligent selection for interactions. In particular, one or more of operations 925, 927, and 929 may be included in operation 520, in which the determination module 420 determines the subset 190 of the entities 131-136, 138-139, 141-146, 148-149, 151-156, 158-159, and 161-162.

In operation 925, the entity identifying module 427 of the determination module 420 accesses the social network data 250 (e.g., the profile data 240). For example, the determination module 420 may access a profile of an entity (e.g., entity 131), as stored in the profile data 240 within the social network database 320. In these example implementations, the profile includes information indicating previous actions taken by the entity in response to reception of one or more interactions (e.g., from the user 180). Such information is specifically accessed in operation 925.

In operation 927, the action analysis module 428 of the determination module 420 analyzes the information accessed in operation 925 and determines that the entity (e.g., entity 131) is likely to be interested in receiving an interaction (e.g., a message that references or includes content) able to be sent by the user 180. Examples of the interaction include a message that references or includes content. Further examples of the interaction include an article, document, an advertisement, a question, an invitation, and any suitable combination thereof. In some example implementations, the interaction is to be recommended that the user 180 send to the entity (e.g., once one or more suitable recipients are identified). Accordingly, the determination module 420 may determine the subset 190 based on this determination that the entity is likely to be interested in receiving the interaction. For example, the subset 190 may be determined to include all entities likely to be interested in receiving an interaction regarding a recent status update for the user 180 (e.g., news that the user 180 has purchased a new boat). In certain example implementations, the determination that the entity is likely to be interested in receiving the interaction is based on content of the interaction (e.g., one or more words, images, hyperlinks in the interaction). As an example, if the user 180 has composed a question regarding boats, the subset 190 may be determined to include entities who have answered questions regarding boats (e.g., boat experts). As another example, if the user 180 has authored an invitation to a fishing trip, the subset 190 may be determined to include entities who enjoy fishing (e.g., as described in their profiles).

In operation 929, the action analysis module 428 of the determination module 420 further analyzes the information accessed in operation 925 and determines that the entity is likely to take a particular action in response to receiving the interaction (e.g., the interaction to be recommended that the user 180 send to the entity). Examples of particular actions include responding to the interaction and forwarding the interaction to other entities (e.g., entities 101-103). The determination that the entity is likely to take a particular action may be made based on previous actions taken by the entity in response to prior interactions received by the entity. In some example implementations, operation 929 is included within operation 927.

Operations 932-936 may be performed anytime after operation 520. For example, as shown in FIG. 9, operations 932, 934, and 936 may be performed after operation 530. In operation 932, the suggestion module 409 presents the user 180 (e.g., via the user device 380) with a recommendation (e.g., a suggestion) to send a particular interaction to each of the entities (e.g., entities 131 and 134) in the subset 190. Operation 932 may be performed based on the determination in operation 927 that the entity is likely to be interested in the interaction, the determination in operation 929 that the entity is likely to take a particular action in response to the interaction, or any suitable combination thereof.

One or more of operations 934 and 936 may be performed as part of operation 932. In operation 934, the suggestion module 409 determines a particular interaction service to be used for the interaction. Examples of interaction services include one or more messaging services provided by the messaging service provider 350 (e.g., electronic messaging, micro-blogging, text messaging, or instant messaging), as well as any internal interaction services (e.g., proprietary user-to-user services) provided by a social network service provider (e.g., social network service provider 330). The suggestion module 409 may determine the particular interaction service based on content (e.g., a word, a title, a subtitle, an image, or a hyperlink) of the interaction to be recommended, content of a prior interaction previously sent by the user 180, a type of the particular interaction service (e.g., electronic messaging or instant messaging), or any suitable combination thereof. Moreover, the suggestion module 409 may determine the particular interaction service based on time of day for the interaction to be recommended (e.g., when the interaction is composed by the user, suggested by the subset processing machine 310, or scheduled to be sent). Furthermore, the suggestion module 409 may determine the particular interaction service based on a location (e.g., a city, an address, or global positioning system coordinates) of an entity (e.g., entity 161) among the subset 190, an event at the location (e.g., a power outage or a cellular service outage), or both. In example implementations that include operation 934, operation 932 may include presenting a further recommendation that the particular interaction service be used to send the interaction. According to various example implementations, any combination of multiple interaction services may be determined (e.g., only one interaction service, multiple interaction services sequentially, or multiple interaction services simultaneously).

In operation 936, the suggestion module 409 determines (e.g., selects) content of the interaction. For example, the suggestion module 409 may determine the content based on one or more personal interests (e.g., expressed as values of attributes in profiles) shared in common by at least some entities (e.g., entities 131 and 134) in the subset 190. In example implementations that include operation 936, operation 932 may include presenting an additional recommendation that the interaction contain the content, as determined in operation 936.

Figure 10:
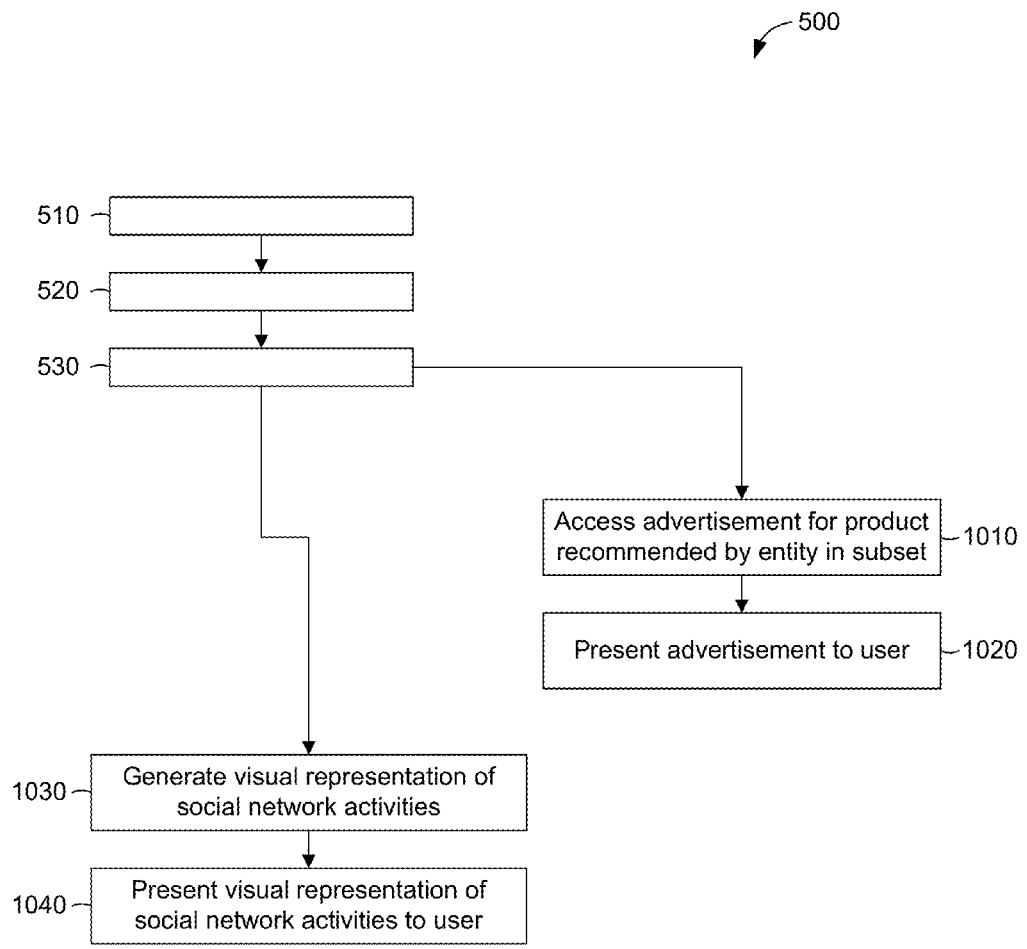

FIG. 10 illustrates some example implementations of the method 500 that include one or more of operations 1010-1040. In operation 1010, the advertising module 414 accesses an advertisement (e.g., sponsored content) that is associated with at least one entity (e.g., entity 131) in the subset 190 of the entities 131-136, 138-139, 141-146, 148-149, 151-156, 158-159, and 161-162. According to various example implementations, the advertisement may be of a product that has been recommended by the at least one entity, or the advertisement may be favorably rated by the at least one entity. Since a subset 190 has been determined in operation 520 as having some characteristic shared in common and likely of interest to the user 180, there is a likelihood that the user 180 would be receptive to, or interested in, the advertisement. The advertisement may take the form of a recommendation, a suggestion, a proposal, or a message pertinent to a product. In some example implementations, the advertisement takes the form of sponsored content (e.g., content paid for at least in part by a sponsoring entity). In operation 1020, the presentation module 404 presents the advertisement accessed in operation 1010 to the user 180 (e.g., via the user device 380). In certain example implementations, the presentation module 404 selects a particular medium for presentation of the advertisement (e.g., selects to use an electronic message, an instant message, a text message, or a micro-blog posting).

In operation 1030, the social graph module 413 generates a visual representation of social network activities (e.g., a graph of social network activity). The visual representation indicates activities performed with respect to at least one social network service (e.g., as provided by the social network service provider 330, the social network provider 340, or the messaging service provider 350). The activities may be performed by the user 180, an entity (e.g., entity 161) in the subset 190, or any suitable combination thereof. According to various example implementations, the visual representation indicates a popularity of the user 180, a popularity of the entity, a frequency of submissions by the user 180, a frequency of submissions by the entity, an amount of time spent by the user in interacting with one or more social network services, an amount of time spent by the entity in interacting with one or more social network services, a degree of precision in interactions sent by the user (e.g., as indicated by the length of the interactions or the number of semantically dissimilar topics in a particular interaction), a degree of precision in interactions sent by the entity, a level of responsiveness to interactions received by the user, a level of responsiveness to interactions received by the entity, or any suitable combination thereof. The visual representation may take the form of a graph that compares activities of the user 180 to activities of the entity.

In operation 1040, the presentation module 404 presents the visual representation to the user 180 (e.g., via the user device 380). According to some example implementations, the presentation module 404 may additionally present the visual representation to the entity (e.g., entity 161, via the user device 360). This may have the effect of providing the user 180, the entity, or both, with a convenient overview of activities performed with respect to at least some of the social network of the user 180.

Figure 11:
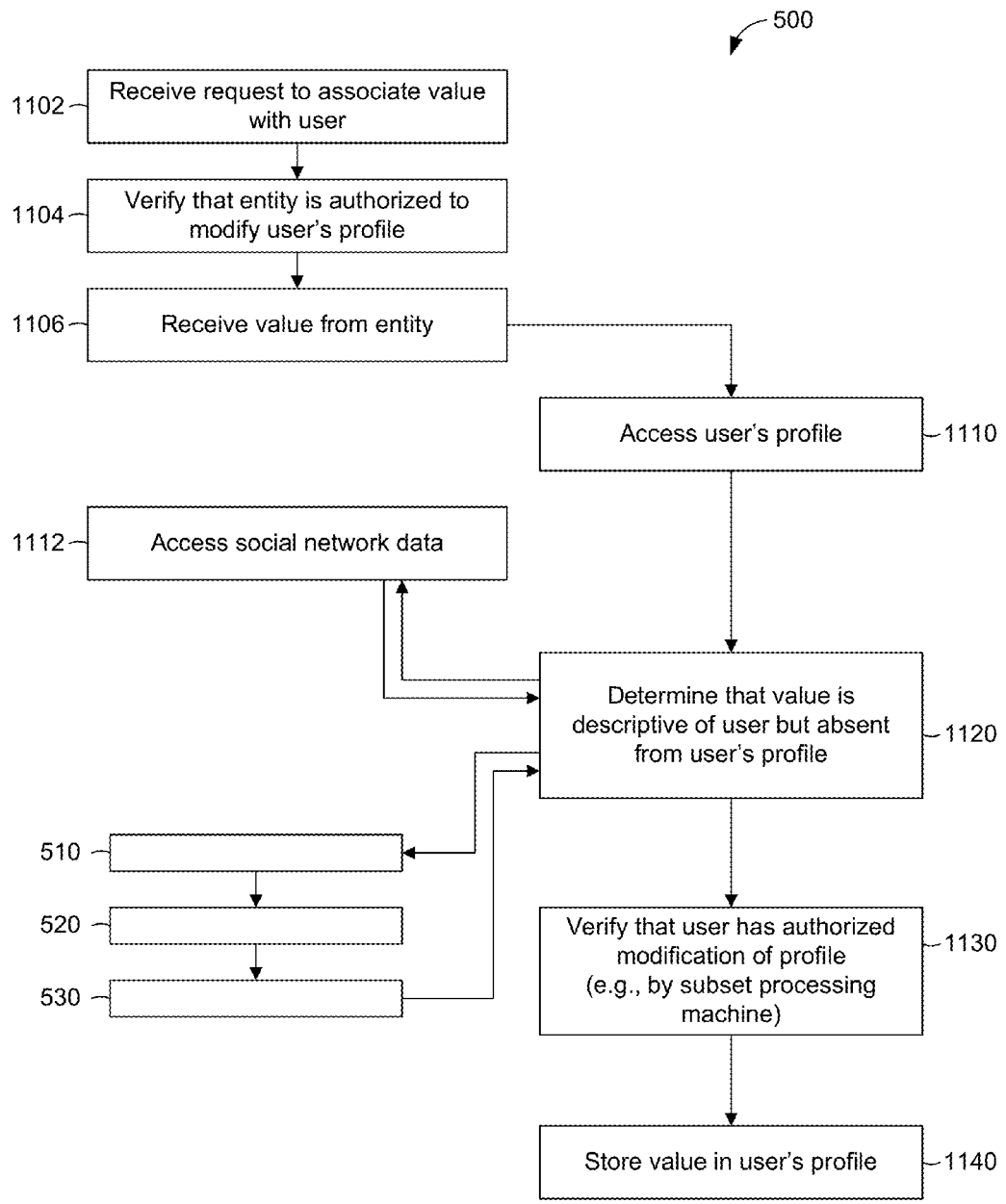

FIG. 11 illustrates some example implementations of the method 500 that include one or more of operations 1102-1140. According to certain example implementations, operations 1110, 1120, and 1140 are performed by the subset processing machine 310 to update (e.g., append or modify) a user profile of the user 180. As shown, operations 510, 520, and 530 may be performed as part (e.g., a precursor task, a subroutine, or a portion) of operation 1120. Operation 1112 certainly may be performed as part of operation 1120. In example implementations that include operation 1106, the user profile of the user 180 may be updated based on a value received from an entity (e.g., entity 161). Accordingly, the subset processing machine 310 may support manual entry of updates to the user profile of the user 180. In example implementations that include operation 1112, the user profile of the user 180 may be updated based on the social network data 250 of the user 180. Hence, the subset processing machine 310 may support automatic updates to the user profile of the user 180.

In operation 1102, the reception module 405 receives a request for association of a value of an attribute with the user 180. As an example, the request may be to store the value in a user profile of the user 180, where the user profile describes the user 180. The request may be submitted by an entity (e.g., entity 161, via the user device 360). For example, the attribute may be "occupation," and the reception module 405 may receive a request to associate the value "Musician" with the user 180 (e.g., by storing the value in the user's profile). This may have the effect of allowing an entity (e.g., a contact, relative, or agent of the user 180) to request a modification to the user's profile.

In operation 1104, the user verification module 406 verifies that the entity (e.g., entity 161) is authorized to modify the user profile of the user 180 (e.g., stored in the profile data 240). For example, the user profile may include (e.g., as values of an attribute) a list of trusted entities (e.g., a spouse or secretary of the user 180) that are authorized to modify the user profile, and the user verification module 406 may access the list of trusted entities and determine that the entity is authorized, based on the list of trusted entities.

In operation 1106, the reception module 405 receives a value of an attribute (e.g., the value requested in operation 1102) to be associated with the user 180. In some example implementations, this value is received as an unsolicited submission from entity (e.g., entity 161, by the user device 360). In certain example implementations, the value is received with the request received in operation 1102. In various example implementations, the value is received in response to a reply to the request received in operation 1102.

In operation 1110, the access module 402 accesses the user profile that describes the user 180. The user profile may be included in the profile data 240. As noted above, the user profile may include an attribute able to have one or more values for the attribute. In some example implementations, a value that is descriptive of the user 180 is absent from the user profile.

In operation 1120, the determination module 420 (e.g., via the attribute module 421) determines that a value, which is descriptive of the user 180, is absent from the user profile. In some example implementations, the determination module 420 (e.g., via the attribute module 421) compares the value to the user profile and determines that the value is absent from a particular attribute within the user profile. As an example, the user profile may include the value "Stanford" for the attribute "undergraduate university" and the value "Yale" for the attribute "graduate university," but have no value for the attribute "graduated from." In such a case, the determination module may determine that the value "Stanford" is descriptive of the user 180 but nonetheless absent from the attribute "graduated from." In certain example implementations, the determination module 420 (e.g., via the semantics module 424) determines that no value in the user profile is semantically similar to the value that is descriptive of the user 180. For example, the determination module 420 may determine that the value "boats" (e.g., for the attribute "interests) is absent from the user profile and that the value "yachts" is similarly absent from the user profile.

According to various example implementations, operation 1120 may include any one or more of operations 1112, 510, 520, and 530. As noted above, operations 510, 520, and 530 may include one or more further operations, and the method 500 may include one or more further operations, as described above with respect to FIG. 5-10.

In operation 1112, the access module 402 accesses the social network data 250 of the user 180. In some example implementations, operation 1120 is performed based on the social network data 250. The determination module 420, in performing operation 1120, may determine that the user 180 is particularly close (e.g., by social distance or interaction intensity) to one or more entities (e.g., entity 161), and that a value of an attribute for the one or more entities is descriptive of the user 180 yet absent from the user profile of the user 180. For example, if the user 180 has several close contacts who are musicians and vegetarian, with interests in meditation and new age music, but the user profile of the user 180 fails to indicate that the user 180 has interest in new age music (e.g., despite indicating that the user is a musician and vegetarian), the determination module 420 may determine that the value "new age music" is descriptive of the user 180 yet absent from the user profile of the user 180.

In operation 1130, the user verification module 406 verifies that the user 180 has authorized modification of his or her user profile, which describes the user 180. For example, the user profile may include (e.g., as a value of an attribute) an indication that the subset processing machine 310 is authorized by the user 180 to modify the user profile.

In operation 1140, the storage module 403 stores the value that is descriptive of the user 180 in the user profile of the user 180. The storage module 403 may store the value based on the results of operation 1104, operation 1120, operation 1130, or any suitable combination thereof. This may have the effect of modifying the user profile of the user 180, on behalf of the user 180 (e.g., without the user 180 initiating the modification of the user profile).

According to various example implementations, one or more of the methodologies described herein may facilitate interaction of information about entities, the social relationships among them, or any suitable combination thereof. In particular, one or more of the methodologies described herein may constitute all or part of a business method (e.g., a business method implemented using a machine) that provides users of one or more social network services with enhanced functionality in identifying entities, profile management, visualizing social networks, managing interactions, controlling access, or any suitable combination thereof.

When these effects are considered as a whole, one or more of the methodologies described herein may obviate a need for certain efforts or resources that otherwise would be involved in social networking activities. Efforts expended by a user in performing social networking activities may be reduced by one or more of the methodologies described herein. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Figure 12:
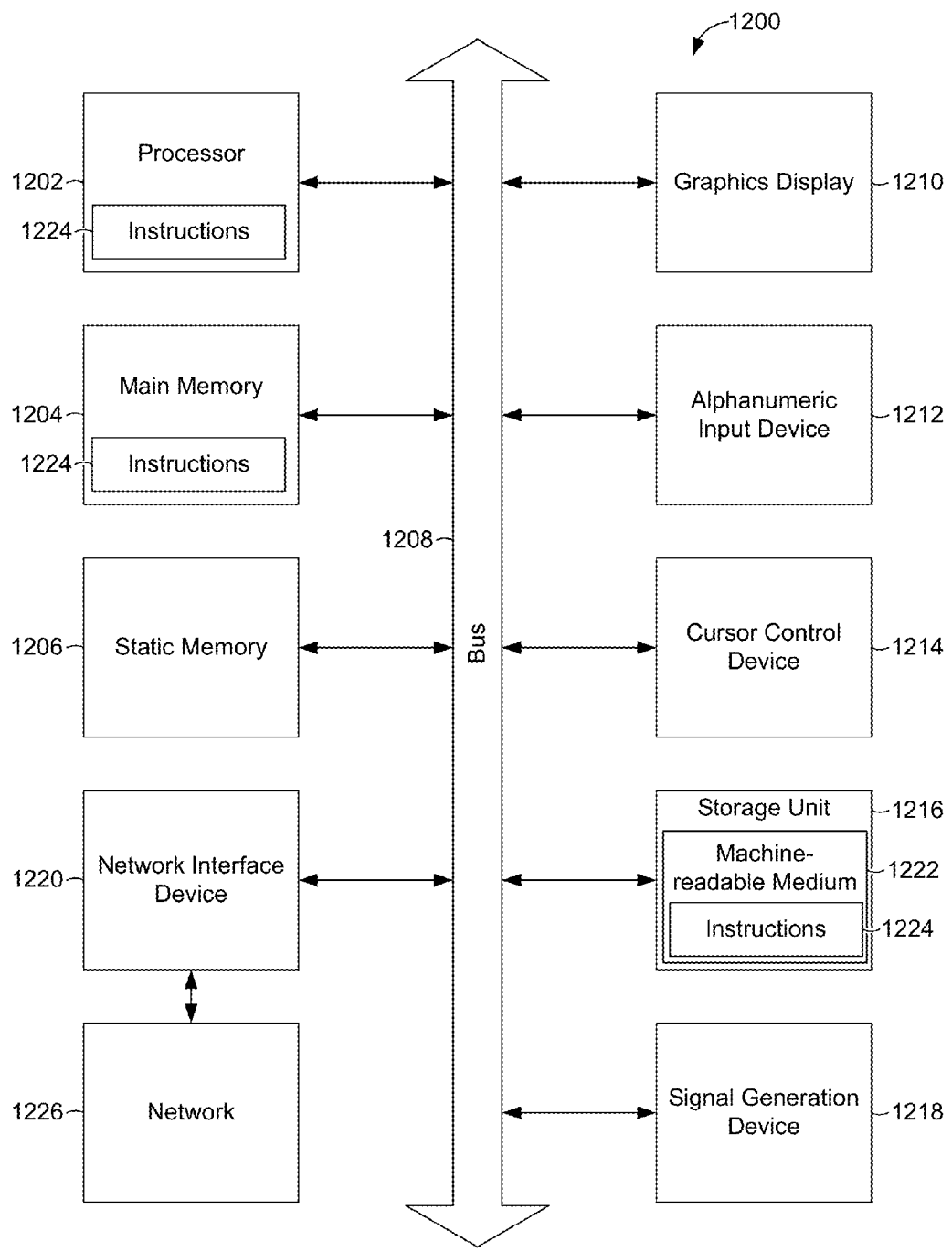
FIG. 12 is a block diagram illustrating components of a machine, according to some example implementations, able to read instructions from a machine-readable medium and perform any one or more of the methodologies discussed herein.

FIG. 12 illustrates components of a machine 1200, according to some example implementations, that is able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system and within which instructions 1224 (e.g., software) for causing the machine 1200 to perform any one or more of the methodologies discussed herein may be executed. In alternative implementations, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224 (sequentially or otherwise) that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 390) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example implementation to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., software) for execution by the machine, such that the instructions, when executed by one or more processors of the machine (e.g., processor 1202), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Figure 13:
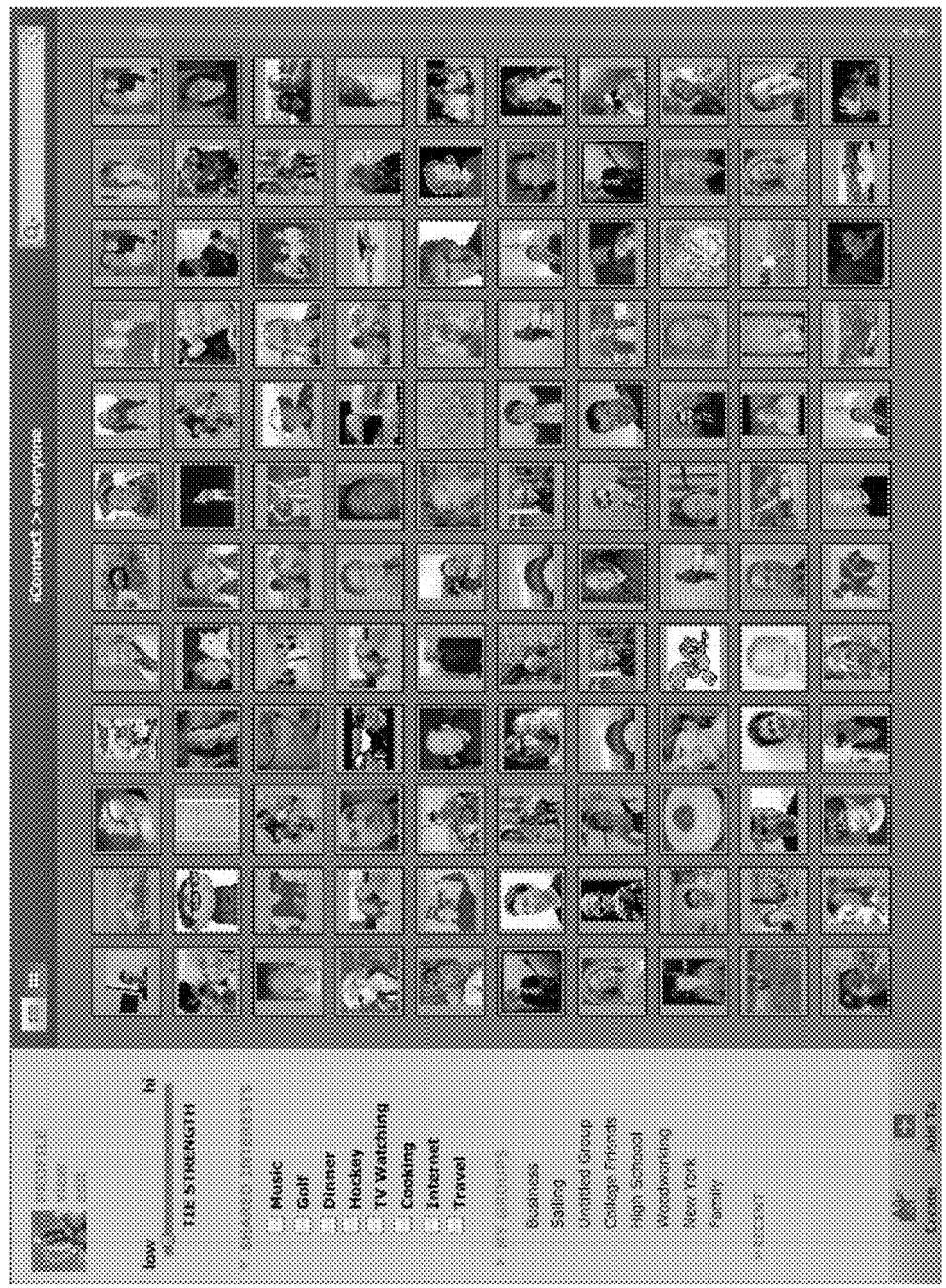
FIG. 13-19 are screenshots illustrating a user interface to present various subsets of socially networked entities, according to some example implementations.
Figure 14:
Figure 15:
Figure 16:
Figure 17:
Figure 18:
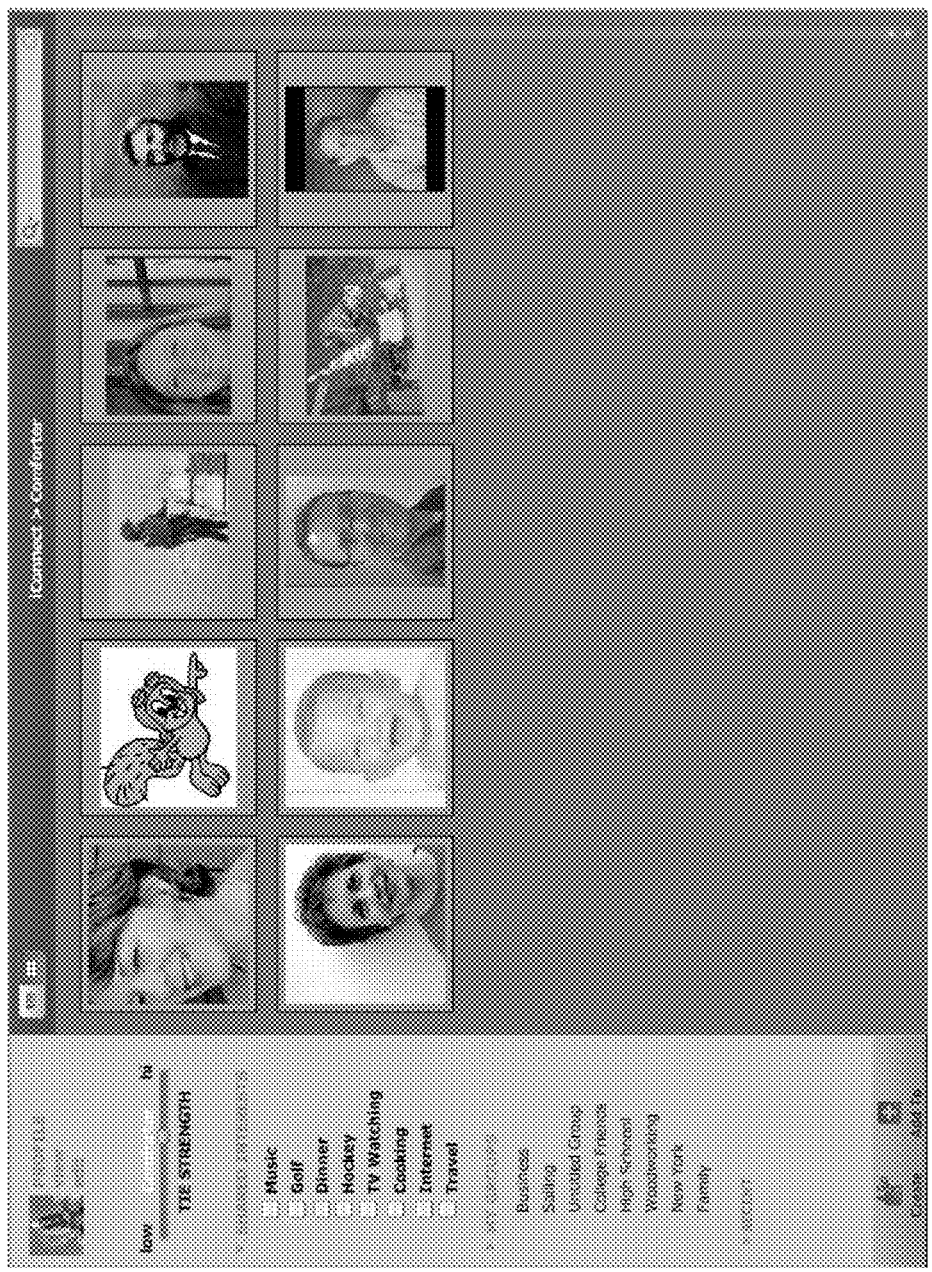
Figure 19:

FIG. 13-19 are screenshots illustrating a user interface to present one or more of various subsets (e.g., subset 190) of socially networked entities, according to some example implementations. One or more of the subsets shown may be determined by the determination module 420 of the subset processing machine 310, for example, as described above with respect to various example implementations of operation 520 in the method 500 (e.g., using the interaction intensity module 422, the social distance module 423, or both). FIG. 13 illustrates an entire social network of a user (e.g., user 180), as indicated by the phrase "everyone" and by the "tie strength" slider being set to the leftmost position, which is marked "low." FIG. 14 illustrates a subset of the social network, as indicated by the phrase "useful contact" and by the position of the "tie strength" slider. FIG. 15 illustrates a smaller subset of the social network, as indicated by the phrase "fun contact" and by the position of the "tie strength" slider. FIG. 16 illustrates a still smaller subset of the social network, as indicated by the phrase "favor contact" and by the position of the "tie strength" slider. FIG. 17 illustrates a yet smaller subset of the social network, as indicated by the phrase "helpmate" and by the position of the "tie strength" slider. FIG. 18 illustrates an even smaller subset of the social network, as indicated by the phrase "comforter" and by the position of the "tie strength" slider. FIG. 19 illustrates a yet further subset of the social network, as indicated by the phrase "soulmate" and by the "tie strength" slider being set to the rightmost position, which is marked "hi." In some example implementations, the user interface is presented as a dashboard that displays one or more clusters of entities with information about at least one of entities.

Figure 20:
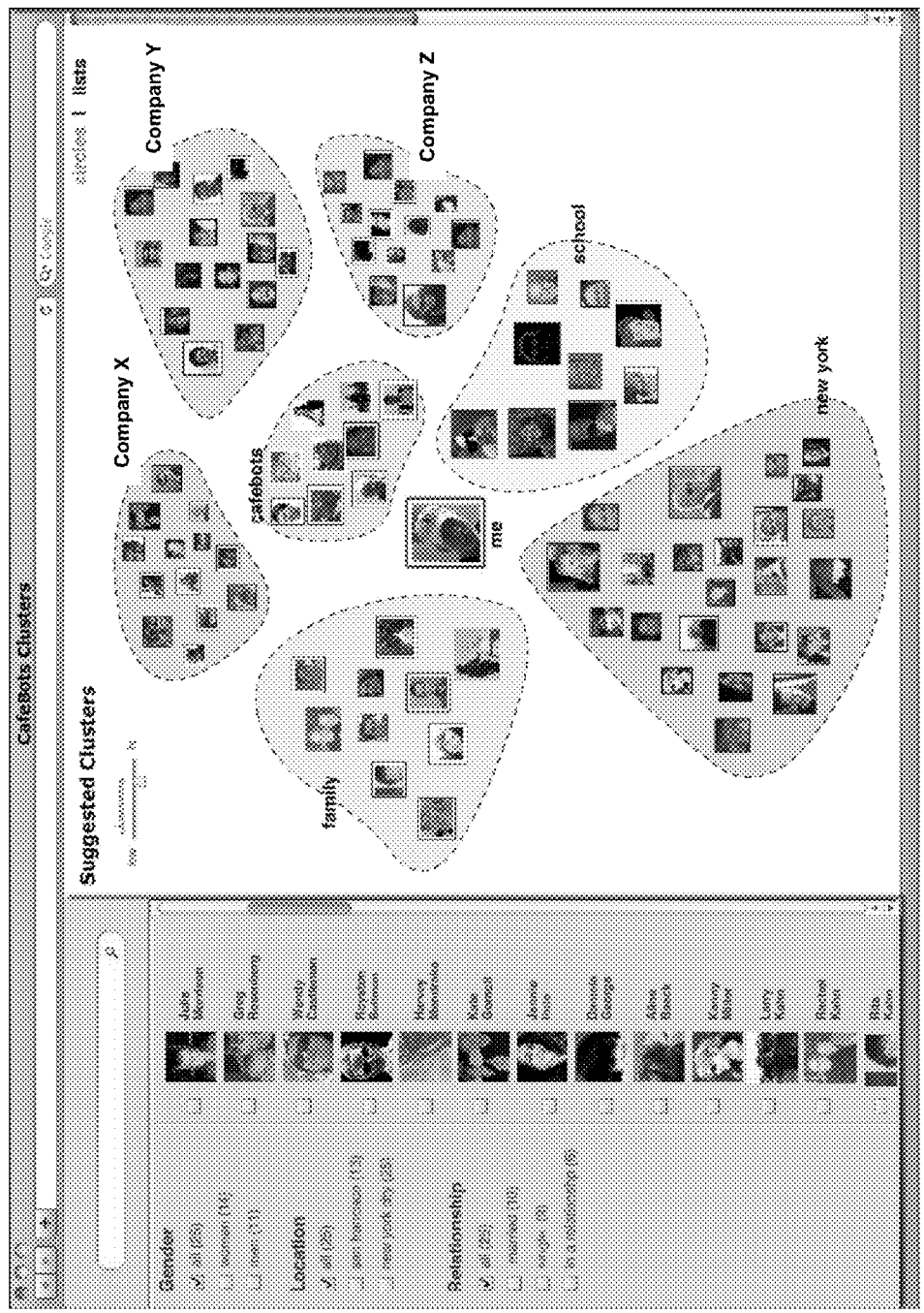
Figure 21:
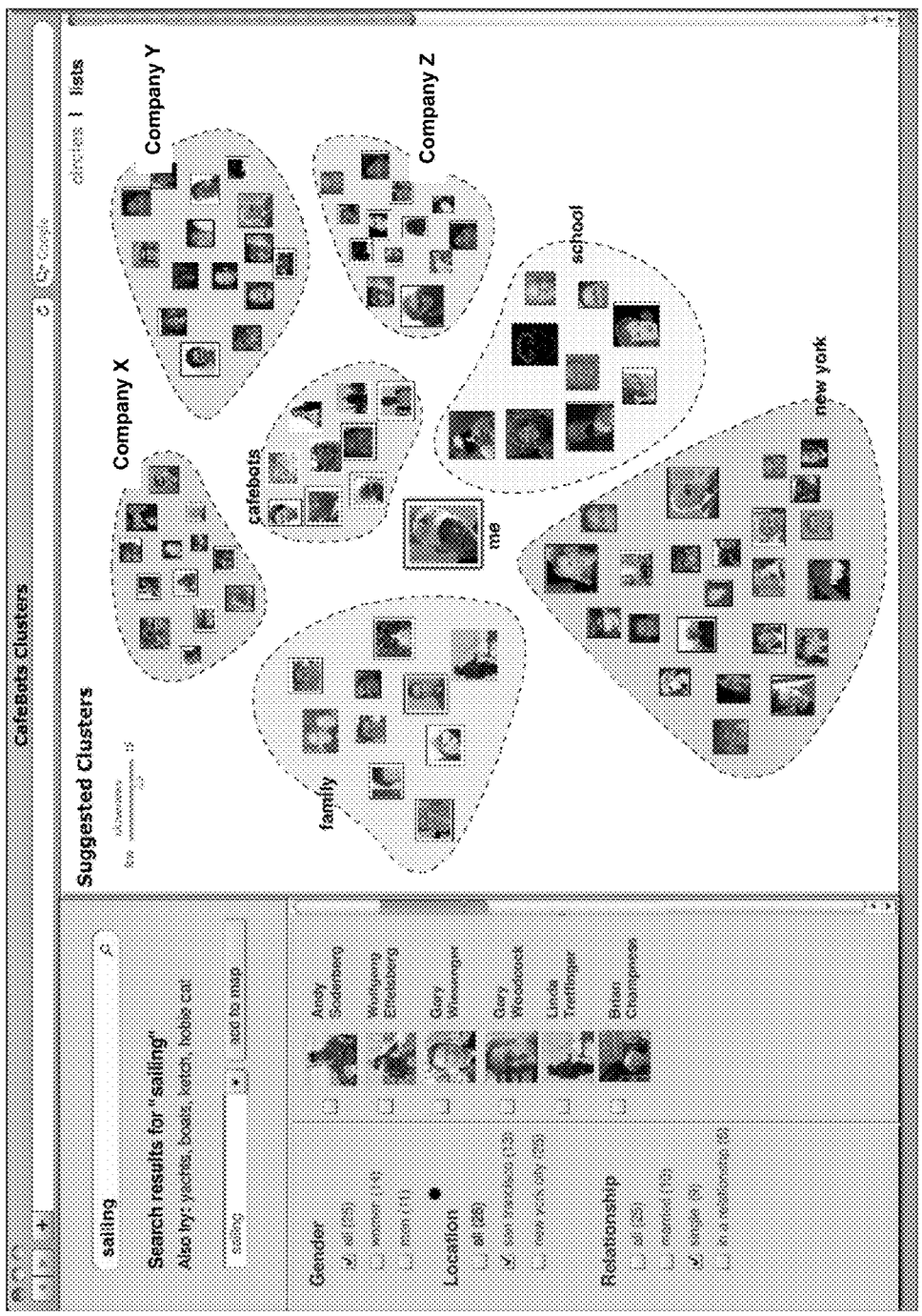
Figure 22:
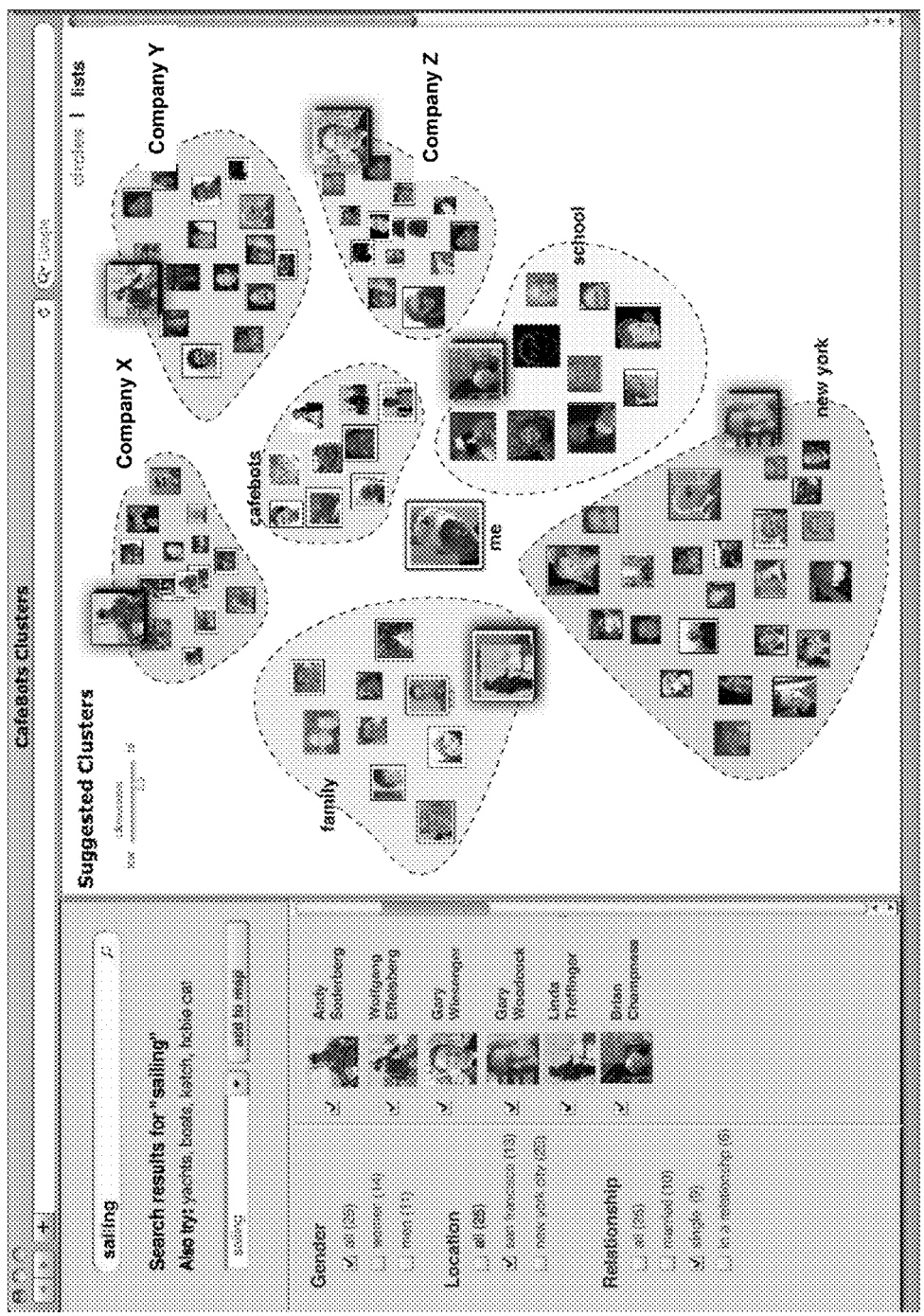
Figure 23:
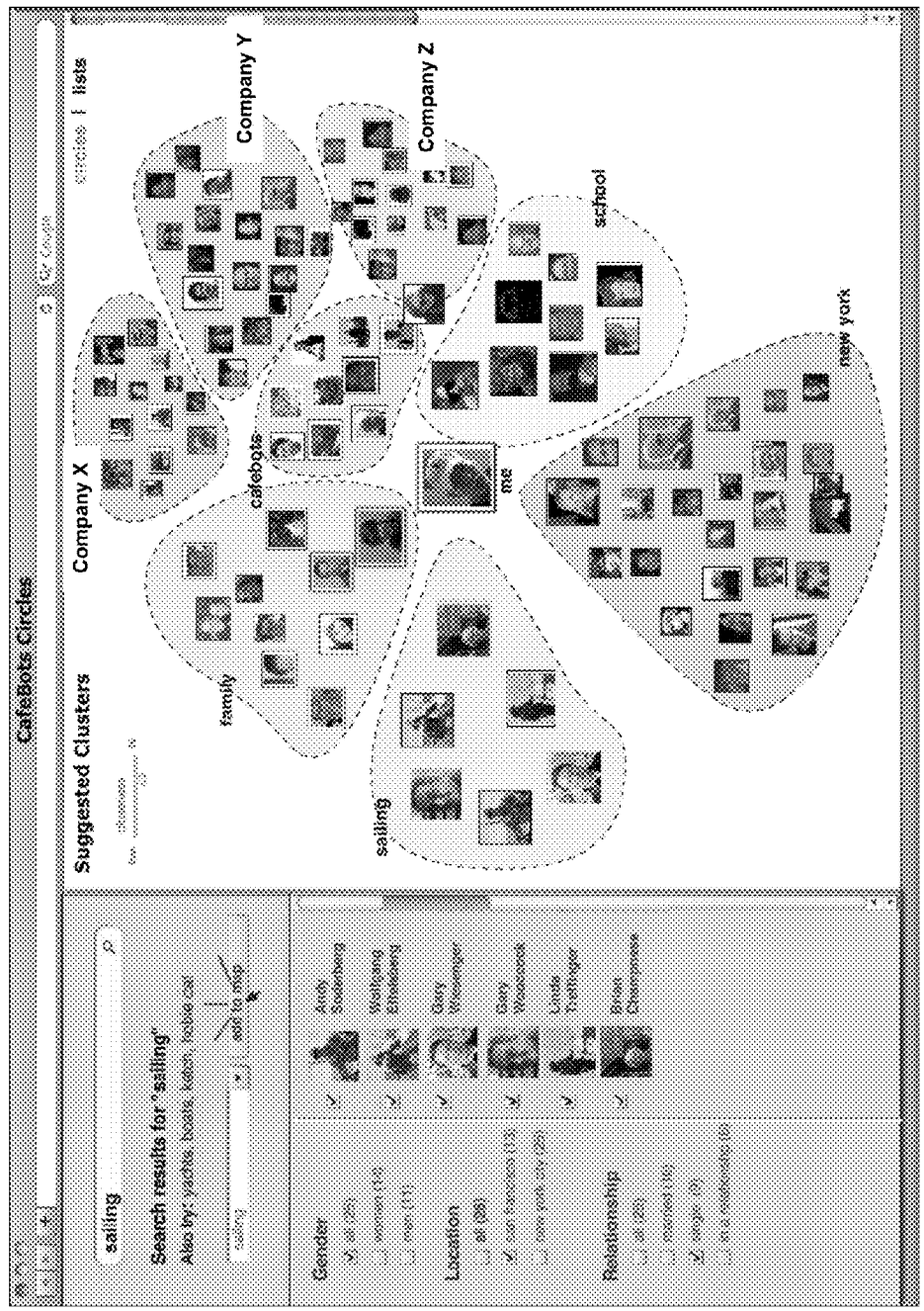
Figure 25:
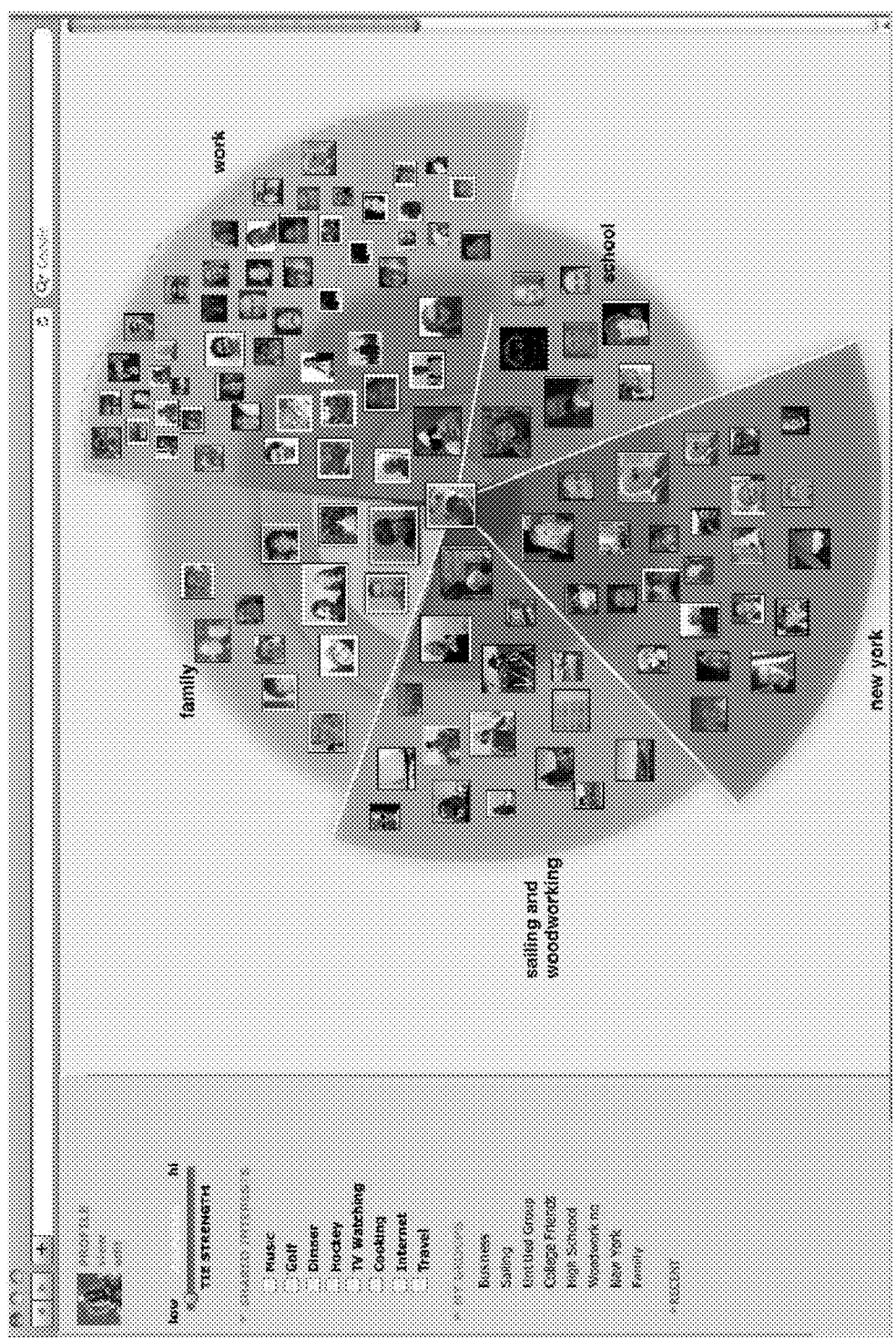
Figure 26:
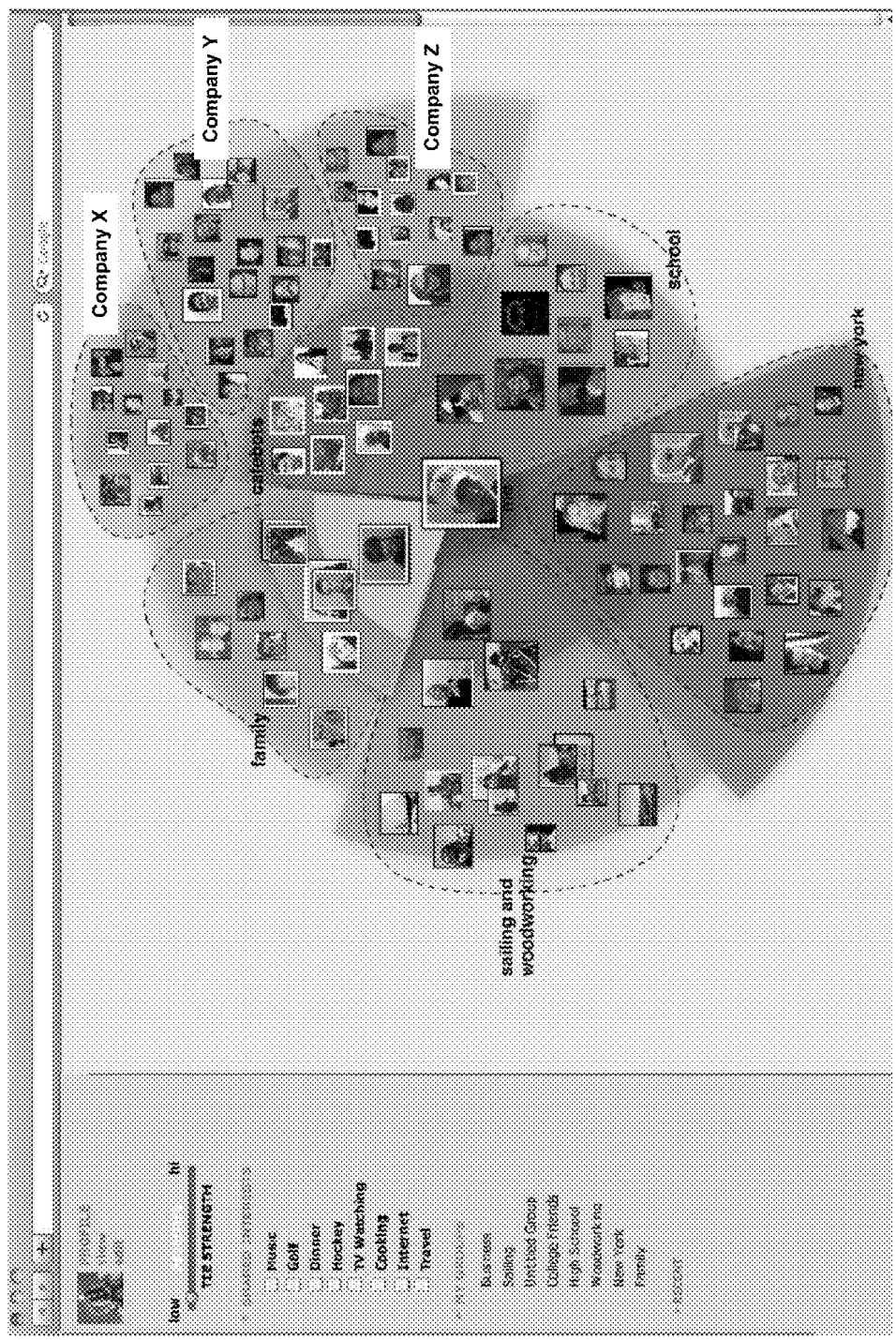

FIG. 20-26 are screenshots illustrating another user interface to present one or more of various subsets (e.g., subset 190) of socially networked entities, according to some example implementations. One or more of the subsets shown may be determined by the determination module 420 of the subset processing machine 310, for example, as described above with respect to various example implementations of operation 520 in the method 500 (e.g., using the attribute module 421, the social cluster module 426, or both). FIG. 20 illustrates a portion of the social network of a user (e.g., user 180), where the portion includes multiple subsets of the social network and the multiple subsets are presented as suggested clusters (e.g., called "circles"), each with a descriptive label (e.g., "family" or "new york"). FIG. 21 illustrates the keyword "sailing" being entered into a text submission field for creation of a new cluster of entities pertinent to "sailing." FIG. 22 illustrates multiple individual entities within the presented clusters being highlighted (e.g., by an enlarged photographic icon) in response to submission of the keyword "sailing" in the text submission field. FIG. 23 illustrates operation of an "add to map" button within the user interface, where the "add to map" button causes the new cluster of entities pertinent to "sailing" to be presented in a user interface, along with the previously presented clusters (e.g., "family" or "new york"). FIG. 24 illustrates an alternative view (e.g., called "lists") of the clusters presented in FIG. 23. FIG. 25 illustrates another alternative view (e.g., as concentric circles of entities) of clusters, where the entities within each of the clusters are arranged by increasing social distance away from the user (e.g., user 180). FIG. 26 illustrates a further alternative view (e.g., of concentric circles of entities grouped by broken lines), also presenting entities within each of the clusters according to increasing social distance away from the user (e.g., user 180). In some example implementations, the user interface is presented as a dashboard that displays one or more clusters of entities and information about one or more entities.

Figure 27:
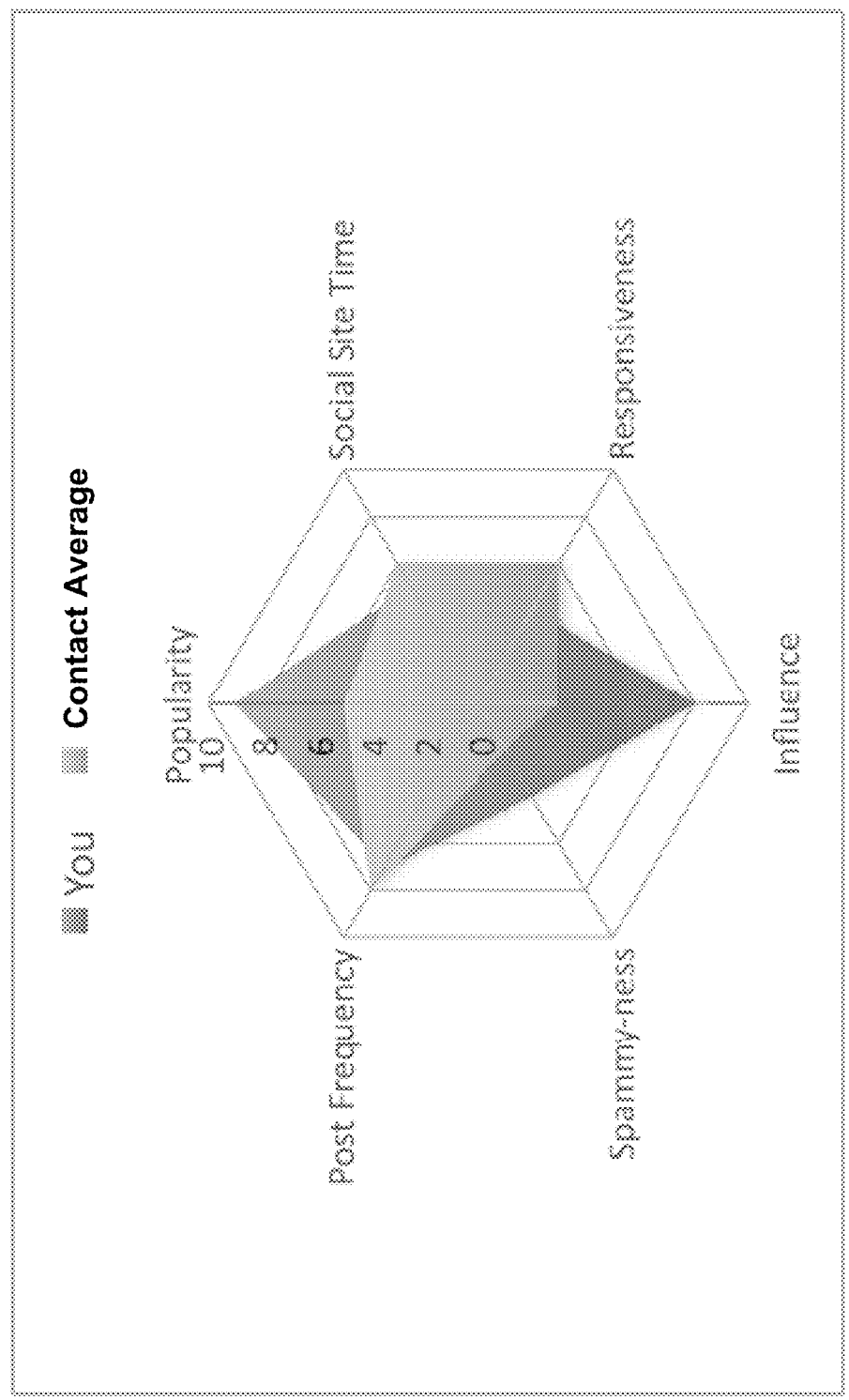
FIG. 27 is a diagram of a visual representation of social network activities, according to some example implementations.

FIG. 27 is a diagram of a visual representation of social network activities, according to some example implementations. As shown, the visual representation depicts six example measurements of social network activity: "popularity," "social site time," "responsiveness," "influence," "spammy-ness," and "post frequency." As illustrative examples, "popularity" may be a relative score (e.g., compared to a typical user of a social networking service) that is determined based on a total number of directly associated entities (e.g., contacts); "social site time" may be a relative score that is determined based on the amount of time spent interacting with one or more social networking services; "responsiveness" may be a relative score that is determined based on an average delay in responding to interactions from entities; "influence" may be a relative score that is determined based on a number of sent interactions upon which an action is taken by entities that received the interactions; "spammy-ness" may be a relative score that is determined based on an average degree of precision in sending interactions to entities; and "post frequency" may be a relative score that is determined based on a number of interactions sent within an interval of time (e.g., monthly). As shown in FIG. 27, social network activity measurements may be presented for a user (e.g., user 180, marked "you"), one or more other entities (e.g., contacts), or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms.

Modules may constitute either software modules (e.g., code embodied on a machine-readable medium or in a transmission signal) or hardware modules. A "hardware module" is a tangible unit capable of performing certain operations and may be configured or arranged in a certain physical manner. In various example implementations, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some implementations, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, interactions may be achieved through signal transmission (e.g., over appropriate circuits and buses) between or among two or more of the hardware modules. In implementations in which multiple hardware modules are configured or instantiated at different times, interactions between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate interactions with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example implementations, the one or more processors or processor-implemented modules may be located in a single geographic location (e.g., within a home environment, an office environment, or a server farm). In other example implementations, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used in the data processing. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method executed by one or more processors, the method comprising:
   accessing, by the one or more processors, social network data of a user from multiple social networks that the user is a member of,
      the social network data including relationship data representative of social relationships between the user and a plurality of entities associated with the user by at least one social network service,
      the social network data including profile data descriptive of the plurality of entities, the profile data including a profile for each of the plurality of entities and one or more attributes within each profile, the profile data including a plurality of values for the attribute, wherein the one or more attributes represent at least one of an intensity of interaction with the user, the plurality of values representing intensities of interaction with the user, and a social distance from the user; and
   receiving, by the one or more processors, a request to provide a subset of the plurality of entities, and in response:
      determining, by the one or more processors, the subset of the plurality of entities based on at least the relationship data retrieved from the plurality of entities, the profile data for each of the plurality of entities representing intensities of interaction with the user, the one or more attributes within each profile of the plurality of entities shared in common with the user, and further based on matching a user search criterion included in the request to semantically similar values of the one or more attributes of profiles of the plurality of entities,
      storing, by the one or more processors, a representation of the subset of the plurality of entities, and
      transmitting, by the one or more processors, instructions to display the representation of the subset and at least one value of an attribute on a display of a computing device.

2. The method of claim 1, further comprising:
   determining a value of the plurality of values representing intensities of interaction, the value being determined based on at least one of a frequency of contact with the user, a length of a particular interaction with the user, and content of a particular interaction with the user.

3. The method of claim 1, further comprising:
   presenting the representation of the subset of the plurality of entities as corresponding to one of at least one of the intensities of interaction with the user and at least one of the social distances from the user.

4. The method of claim 1, further comprising:
   determining at least one of the values for the social distance based on the profile data, the social distance indicating at least one of:
      an extent of trust between the entity and the user, and
      a level of respect for the entity by the user.

5. The method of claim 1, further comprising:
   determining at least one of the values for the social distance based on the profile data, the social distance indicating at least one of:
      a number of entities designated as contacts shared in common by the user and by the entity; and
      a personal interest designated as shared in common by the user by the entity.

6. The method of claim 1, further comprising:
   retrieving the social network data from a plurality of server machines based on the user being associated with the plurality of entities by multiple social network services, retrieving the social network data including:
      retrieving the relationship data from at least some of the plurality of server machines; and
      retrieving the profile data from at least some of the plurality of server machines.

7. The method of claim 6, wherein:
   retrieving the social network data from the plurality of server machines is based on the user being associated with the plurality of entities by multiple social network services including at least two of a contact management service, a micro-blogging service and a messaging service.

8. The method of claim 1, wherein:
   the social network data of the user is retrieved from a plurality of server machines that provide multiple social network services to the user,
   the multiple social network services each associating a different subset of the plurality of entities with the user.

9. The method of claim 8, wherein:
   the multiple social network services comprise at least two of a contact management service, a micro-blogging service and a messaging service.

10. The method of claim 1, wherein the at least one social network service provides a messaging service to the user, the messaging service using a contact database that stores information usable to address a interaction to a potential recipient among a plurality of potential recipients.

11. The method of claim 10, wherein the potential recipient is one of the plurality of entities and is at least one of:
    a sender of a message previously communicated to the user,
    a receiver of another message previously communicated from the user,
    a sender of a further message that mentions the user, and
    a receiver of the further message that mentions the user.

12. The method of claim 1, wherein determining the subset of the plurality of entities is based on a particular value of an attribute of the one or more attributes being included in each profile of one or more example entities selected by the user from the plurality of entities.

13. The method of claim 1, further comprising:
    presenting the user with a recommendation that a message be communicated to each entity in the subset of the plurality of entities.

14. The method of claim 1, further comprising determining that a search of at least some of the plurality of entities by the user is requested, wherein determining the subset is in response to the search.

15. The method of claim 1 further comprising presenting a visual representation of activities to the user, the activities being performed with respect to the at least one social network service by at least one of the user or an entity in the subset of the plurality of entities, the visual representation indicating at least one of:
    popularity,
    frequency of submissions,
    amount of time spent in interacting with the at least one social network service,
    precision in interactions sent, and
    responsiveness to interactions received.

16. The method of claim 1, further comprising:
    accessing an advertisement associated with an entity in the subset of the plurality of entities; and
    presenting the advertisement to the user.

17. The method of claim 1, further comprising:
determining that a live interaction between the user and an entity in the subset of the plurality of entities is occurring, the profile of the entity including a status update for the entity published by the at least one social network service; and
presenting the status update for the entity to the user in response to the live interaction.

18. A non-transitory machine-readable storage medium comprising instructions that, when executed by one or more processors of a machine, cause the machine to perform operations comprising:
accessing social network data of a user from multiple social networks that the user is a member of,
the social network data including relationship data representative of social relationships between the user and a plurality of entities associated with the user by at least one social network service,
the social network data including profile data descriptive of the plurality of entities, the profile data including a profile for each of the plurality of entities and one or more attributes within each profile, the profile data including a plurality of values for the attribute, wherein the one or more attributes represent at least one of an intensity of interaction with the user, the plurality of values representing intensities of interaction with the user, and a social distance from the user; and
receiving, by the one or more processors, a request to provide a subset of the plurality of entities, and in response:
determining the subset of the plurality of entities, determining based on at least the relationship data retrieved from the plurality of entities, the profile data for each of the plurality of entities representing intensities of interaction with the user, the one or more attributes within each profile of the plurality of entities shared in common with the user, and further based on matching a user search criterion included in the request to semantically similar values of the one or more attributes of profiles of the plurality of entities,
storing a representation of the subset of the plurality of entities, and
transmitting instructions to display the representation of the subset and at least one value of an attribute on a display of a computing device.

19. A system, comprising:
one or more processors; and
a machine-readable storage medium comprising instructions that, when executed by the one or more processors, cause the one or more processors to perform operations comprising:
accessing social network data of a user from multiple social networks that the user is a member of,
the social network data including relationship data representative of social relationships between the user and a plurality of entities associated with the user by at least one social network service,
the social network data including profile data descriptive of the plurality of entities, the profile data including a profile for each of the plurality of entities and one or more attributes within each profile, the profile data including a plurality of values for the attribute, wherein the one or more attributes represent at least one of an intensity of interaction with the user, the plurality of values representing intensities of interaction with the user, and a social distance from the user;
receiving a request to provide a subset of the plurality of entities, and in response:
determining the subset of the plurality of entities based on at least the relationship data retrieved from the plurality of entities, the profile data for each of the plurality of entities representing intensities of interaction with the user, the one or more attributes within each profile of the plurality of entities shared in common with the user, and further based on matching a user search criterion included in the request and comparing the one or more attributes of profiles of the plurality of entities to one or more semantically similar attributes associated with the user;
storing a representation of the subset of the plurality of entities, and
transmitting instructions to display the representation of the subset and at least one value of an attribute on a display of a computing device.

20. The method of claim 1, further comprising:
determining that an attribute associated with the user is absent a value that is descriptive of the user;
determining, by the one or more processors, that a descriptive value is included for a respective attribute of at least one profile of the plurality of entities; and
transmitting a recommendation to the user to include the descriptive value of the respective attribute of the at least one profile of the plurality of entities for the attribute associated with the user.

* * * * *